United States Patent
Bridges et al.

(10) Patent No.: US 12,506,819 B1
(45) Date of Patent: Dec. 23, 2025

(54) PLUGGABLE MEDIUM ACCESS CONTROL LAYERS AND ASSOCIATED METHODS

(71) Applicant: Cable Television Laboratories, Inc., Louisville, CO (US)

(72) Inventors: Mark Bridges, Brooks, GA (US); Christopher J. Corcimiglia, Cumming, GA (US); Jonathan Ray Dennis, Aurora, CO (US); Randy Levensalor, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 380 days.

(21) Appl. No.: 18/152,120

(22) Filed: Jan. 9, 2023

Related U.S. Application Data

(63) Continuation-in-part of application No. 17/406,963, filed on Aug. 19, 2021, now Pat. No. 11,979,339.

(60) Provisional application No. 63/297,481, filed on Jan. 7, 2022, provisional application No. 63/224,693, filed on Jul. 22, 2021, provisional application No. 63/067,549, filed on Aug. 19, 2020.

(51) Int. Cl.
*H04L 69/323* (2022.01)
*H04L 41/0803* (2022.01)

(52) U.S. Cl.
CPC ........ *H04L 69/323* (2013.01); *H04L 41/0803* (2013.01)

(58) Field of Classification Search
CPC . H04L 69/323; H04L 41/0803; H04L 69/321; H04L 69/324; H04L 49/70
See application file for complete search history.

(56) References Cited

U.S. PATENT DOCUMENTS

| | | | |
|---|---|---|---|
| 5,712,851 A | 1/1998 | Nguyen et al. | |
| 5,974,465 A | 10/1999 | Wong | |
| 6,862,622 B2 | 3/2005 | Jorgensen | |
| 8,069,465 B1 | 11/2011 | Bartholomay et al. | |
| 10,505,847 B1* | 12/2019 | Singarayan | H04L 61/103 |
| 12,250,564 B2* | 3/2025 | Manapragada | G06K 7/10831 |
| 2002/0029238 A1 | 3/2002 | Okuhata | |
| 2007/0098007 A1 | 5/2007 | Prodan et al. | |
| 2007/0133562 A1* | 6/2007 | Ghiasi | H04L 49/357 370/395.42 |

(Continued)

FOREIGN PATENT DOCUMENTS

KR 100897853 B1 5/2009

OTHER PUBLICATIONS

Sharma et al., "FreeMAC: Framework for Multi-Channel MAC Development on 802.11 Hardware", In Proceedings of the ACM workshop on programmable routers for extensible services of tomorrow (pp. 69-74). Seattle, WA: ACM. 2008 (Year: 2008).*

(Continued)

*Primary Examiner* — Shah M Rahman
(74) *Attorney, Agent, or Firm* — PdZ Patent Law, PLLC

(57) ABSTRACT

A pluggable medium access controller (MAC) layer includes (1) a physical (PHY) layer interface configured to interface the pluggable MAC layer with a PHY layer and (2) a plurality of MAC modules. Each MAC module of the plurality of MAC modules is configured to implement respective functionality of the pluggable MAC layer. In some embodiments, the plurality of MAC modules are implemented in software, and the pluggable MAC layer is accordingly virtually configurable.

22 Claims, 25 Drawing Sheets

(56) References Cited

U.S. PATENT DOCUMENTS

| | | | |
|---|---|---|---|
| 2007/0208848 A1 | 9/2007 | Bhesania et al. | |
| 2009/0034460 A1* | 2/2009 | Moratt | H04W 72/569 370/329 |
| 2010/0061235 A1 | 3/2010 | Pai et al. | |
| 2012/0297091 A1* | 11/2012 | Haga | G06F 13/385 710/3 |
| 2013/0010664 A1* | 1/2013 | Kang | H04W 52/0222 370/311 |
| 2014/0213371 A1 | 7/2014 | Jain et al. | |
| 2015/0074168 A1* | 3/2015 | Hartman | H04L 61/5007 709/201 |
| 2015/0098332 A1 | 4/2015 | Eriksson et al. | |
| 2015/0103693 A1* | 4/2015 | Korber | H04L 61/35 370/254 |
| 2015/0181514 A1* | 6/2015 | Belghoul | H04W 76/27 370/254 |
| 2015/0200849 A1* | 7/2015 | Wen | H04L 45/586 370/328 |
| 2016/0119898 A1 | 4/2016 | Lou et al. | |
| 2016/0212792 A1* | 7/2016 | Chang | H04W 76/22 |
| 2017/0019241 A1 | 1/2017 | Jin et al. | |
| 2017/0265216 A1 | 9/2017 | Andreoli-Fang et al. | |
| 2017/0339706 A1* | 11/2017 | Andreoli-Fang | H04W 72/51 |
| 2018/0175924 A1* | 6/2018 | Ercan | H04W 76/16 |
| 2018/0270103 A1 | 9/2018 | Chapman et al. | |
| 2020/0007449 A1 | 1/2020 | Morin et al. | |
| 2020/0099548 A1 | 3/2020 | Andreoli-Fang et al. | |
| 2020/0145323 A1* | 5/2020 | Finkelstein | H04L 69/323 |
| 2020/0229025 A1* | 7/2020 | Nakano | H04L 47/805 |
| 2020/0280370 A1* | 9/2020 | Frozenfar | H04B 10/25891 |
| 2020/0343988 A1* | 10/2020 | Nandiraju | H04J 3/0667 |
| 2021/0029752 A1 | 1/2021 | Ohlsson et al. | |
| 2021/0084523 A1 | 3/2021 | Kucera | |
| 2021/0144589 A1* | 5/2021 | Seok | H04W 28/065 |
| 2021/0175925 A1 | 6/2021 | Mehrabani | |
| 2021/0243639 A1 | 8/2021 | Sanaullah et al. | |
| 2021/0243676 A1 | 8/2021 | Files et al. | |
| 2021/0282082 A1 | 9/2021 | Mildh et al. | |
| 2021/0409102 A1 | 12/2021 | Mehrabani | |
| 2022/0030511 A1 | 1/2022 | Wang et al. | |
| 2022/0053491 A1 | 2/2022 | Sevindik et al. | |
| 2022/0053607 A1 | 2/2022 | Rice et al. | |
| 2022/0124029 A1* | 4/2022 | Finkelstein | H04L 12/4641 |
| 2022/0159621 A1 | 5/2022 | Awad et al. | |
| 2022/0321566 A1* | 10/2022 | Coyle | H04L 63/101 |

OTHER PUBLICATIONS

Dely et al., "CloudMAC—An OpenFlow based Architecture for 802.11 MAC Layer Processing in the Cloud", Proc. IEEE Globecom Workshops (GC Wkshps), pp. 186-191, 2012. (Year: 2012).*

Doerr et al. "MultiMAC—An Adaptive MAC Framework for Dynamic Radio Networking", IEEE DySPAN, pp. 548-555, Nov. 2005 (Year: 2005).*

Ryan et al., "Maximizing vCMTS Data Plane Performance with 3rd Gen Intel® Xeon® Scalable Processor Architecture", Intel Corporationm, White Paper, Processor Architecture Study, 2021, Total Pages: 16 (Year: 2021).*

* cited by examiner

PLUGGABLE MEDIUM ACCESS CONTROL LAYERS AND ASSOCIATED METHODS

RELATED APPLICATIONS

This application is a continuation in part of U.S. patent application Ser. No. 17/406,963, filed on Aug. 19, 2021, which claims benefit of priority to each of (a) U.S. Provisional Patent Application Ser. No. 63/067,549, filed on Aug. 19, 2020, and (b) U.S. Provisional Patent Application Ser. No. 63/224,693, filed on Jul. 22, 2021. This application also claims benefit of priority to U.S. Provisional Patent Application Ser. No. 63/297,481, filed on Jan. 7, 2022. Each of the aforementioned patent applications is incorporated herein by reference.

BACKGROUND

Communication networks are very common in modern society. For example, access communication networks are widely used to provide communication services, such as Internet service, telephone service, video service, etc., to end users in respective geographic areas. As another example, long-haul communication networks are extensively used to transport data across long distances, such as across continents or across oceans.

Communication networks are commonly modeled using an open systems interconnection (OSI) model, where each node in the network is represented by an OSI layer stack. The OSI layer stack makeup will vary among applications, but the layer stack typically includes at least some of the following layers in order from bottom to top, as illustrated in FIG. 1: (1) a physical layer 102, (2) a data link layer 104, (3) a network layer 106, (4) a transport layer 108, (5) a session layer 110, (6) a presentation layer 112, and (7) an application layer 114.

Physical (PHY) layer 102, also referred to as "layer 1," a. Data link layer 104, also referred to as "layer 2," may encode transmission entities received from upper layers into bits for the physical layer. Additionally, data link layer 104 may decode bits received from the physical layer into transmission entities for upper layers. Furthermore, data link layer 104 may provide transmission protocol and management, frame synchronization, and flow control. Data link layer 104 often includes two sublayers, i.e., a medium access control (MAC) sublayer 116 and a logical link control (LLC) sublayer 118. MAC sublayer 116 provides flow control and multiplexing for a transmission medium, and LLC sublayer 118 provides flow control and multiplexing for a logical link. MAC sublayer 116 sometimes includes two constituent elements (not shown), i.e., an upper MAC and a lower MAC. The upper MAC interacts with LLC sublayer 118, and the lower MAC interacts with PHY layer 102. Network layer 106, also referred to as "layer 3," provides switching and routing, and transport layer 108, also referred to as "layer 4," helps ensure complete data transfer. Session layer 110, also referred to as "layer 5," controls connections between applications, and presentation layer 112, also referred to as "layer 6," translates between an application format and a network format. Finally, application layer 114, also referred to as "layer 7," supports application processes.

As one example of network operation according to the OSI model, consider a network where device A sends data to device B over a communication medium C. At device A, data travels down device A's OSI layer stack from its application layer to its physical layer. The data then travels from device A's physical layer to device B's physical layer via communication medium C, and the data then travels up device B's OSI layer stack from its physical layer to its application layer.

DETAILED DESCRIPTION OF THE EMBODIMENTS

Figure 1:
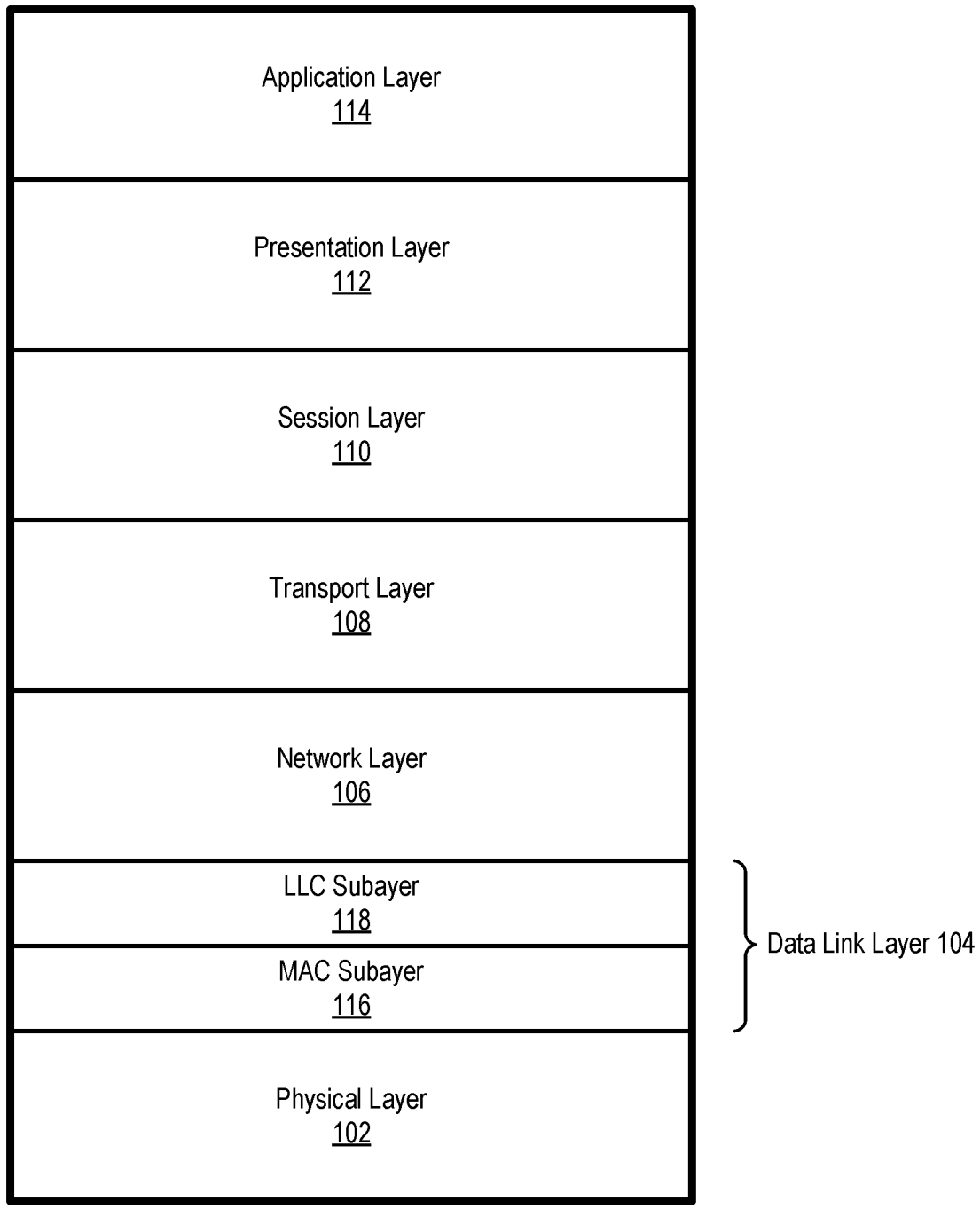
FIG. 1 is an illustration of a prior art open systems interconnection (OSI) model layer stack.

It is frequently desirable for a communication network to be capable of handling data packets in a non-uniform manner. For example, quality of service (QoS) requirements may vary among data packets, and it may therefore be desirable for a communication network to handle data packets in a manner commensurate with their respective QoS requirements. Additionally, communication networks increasingly need to support two or more different data transmission protocols on a common communication medium. For example, a cable communication network may need to support two or more different Data Over Cable Service Interface Specification (DOCSIS) data transmission protocols on a common communication medium. As another example, a communication network may need to support a wireline data transmission protocol and a wireless transmission protocol on a common communication medium, such as to achieve converged wireline and wireless data transmission.

Conventional communication networks supporting multiple data transmission protocols on a common communication medium include a single scheduler for handling the multiple data transmission protocols. Such conventional schedulers are complex, are not readily scalable, and may be difficult (or impossible) to upgrade without disrupting communication network operation.

Disclosed herein are new modular schedulers and associated methods which at least partially overcome one or more of the above-discussed drawbacks of conventional schedulers. The new modular schedulers include a plurality of scheduler modules. For example, some embodiments include a respective scheduler module for each data transmission protocol handled by the scheduler. As another example, some embodiments include a respective scheduler module for at least two different QoS designators handled by the scheduler. As another example, some embodiments include a respective scheduler module for at least two different classes of data flows handled by the scheduler. As an additional example, some embodiments include a respective scheduler for at least two different termination devices handled by the scheduler. The new schedulers optionally further include a coordinator configured to allocate communication medium resources, such as communication medium transmission time and/or communication medium frequency (or wavelength), among multiple scheduler modules. Additionally, some embodiments further include a multiplexer/demultiplexer configured to direct control messages to an appropriate scheduler module and to interface multiple scheduler modules with one or more shared elements (e.g., a shared MAC data plane, a shared PHY layer, and/or a shared communication medium).

The new modular schedulers may achieve significant advantages that cannot be realized by conventional schedulers. For example, in some embodiments, additional scheduler modules can be added without impacting operation of existing scheduler modules, thereby facilitating ease of scheduler upgrade to support evolving communication network requirements. For instance, assume that a new data transmission protocol needs to be supported in a communication network. In certain embodiments of the new modular schedulers, a new scheduler module can be added to support the new data transmission protocol without taking the existing scheduler modules offline, thereby enabling the scheduler to be upgraded without disrupting communication network operation. A conventional scheduler, in contrast, cannot be upgraded in such a non-disruptive manner.

As another example, some embodiments of the new modular schedulers enable an existing scheduler module to be terminated without impacting other scheduler modules. For example, assume that an existing data transmission protocol is being retired. In certain embodiments of the new modular schedulers, a scheduler module handling the data transmission protocol to be retired could be terminated without affecting other scheduler modules, thereby eliminating unnecessary scheduler activity, which helps minimize use of computing resources and energy required for the computing resources. Additionally, terminating an unneeded scheduler module may eliminate licensing costs associated with the scheduler module's operation. A conventional scheduler, in contrast, typically cannot be readily modified to remove unneeded scheduler functionality.

Furthermore, some embodiments are capable of dynamically instantiating and/or terminating scheduler modules, such as based on changing communication network requirements and/or operating conditions, thereby helping ensure that the modular scheduler has an optimum configuration for its current operating environment. For example, assume that a new termination device is connected to a communication network and that the new termination devices requires a data transmission protocol that is not currently used in the communication network. In certain embodiments of the new modular schedulers, the communication network generates a signal indicating that a new scheduler module is needed, and the modular scheduler automatically instantiates a new scheduler module to support the new data transmission protocol, in response to the signal. As another example, assume that a sole termination device requiring a given data transmission protocol is removed from a communication network. In some embodiments, the communication network generates a signal indicating that the scheduler module associated with the data transmission protocol is no longer needed, and the modular scheduler automatically terminates the associated scheduler module in response to the signal.

Moreover, the modular nature of the new schedulers may facilitate scheduler module updates. For example, some embodiments support scheduler module updates (or scheduler module modifications) on an individual scheduler module basis, thereby enabling a particular scheduler module to be updated and/or modified without affecting other scheduler modules. Accordingly, the new modular schedulers may enable scheduler updates or modifications at a higher level of granularity than is possible with conventional schedulers. Furthermore, certain embodiments are capable of pulling scheduler module updates from a remote source, i.e., obtaining updates from the remote source at the discretion of the scheduler, in addition to, or in place of, relying on the remote source to push updates to the scheduler.

Additionally, some embodiments are configured to automatically change scheduler configuration, such as by adding or removing scheduler modules, or by individually changing scheduler module configurations, in response to communication network analytics. For example, assume that communication network analytics indicate that one or more scheduler modules are overloaded. Particular embodiments of the new modular schedulers may be configured to automatically instantiate a new scheduler module in response to these analytics, thereby alleviating the scheduler module overloading. As another example, assume that communication network analytics indicate that a particular class of data flows would benefit from low latency handling. Some embodiments of the new modular schedulers may be configured to automatically instantiate a new scheduler module to perform low-latency scheduling of the data flows in response to these analytics, thereby automatically improving communication network performance. As yet another example, assume that communication network analytics indicate that a scheduler has excess capacity. Certain embodiments of the new modular schedulers may be configured to automatically terminate one or more scheduler modules in response to the communication network analytics, thereby helping minimize required computing resources and associated energy consumption.

Figure 2:
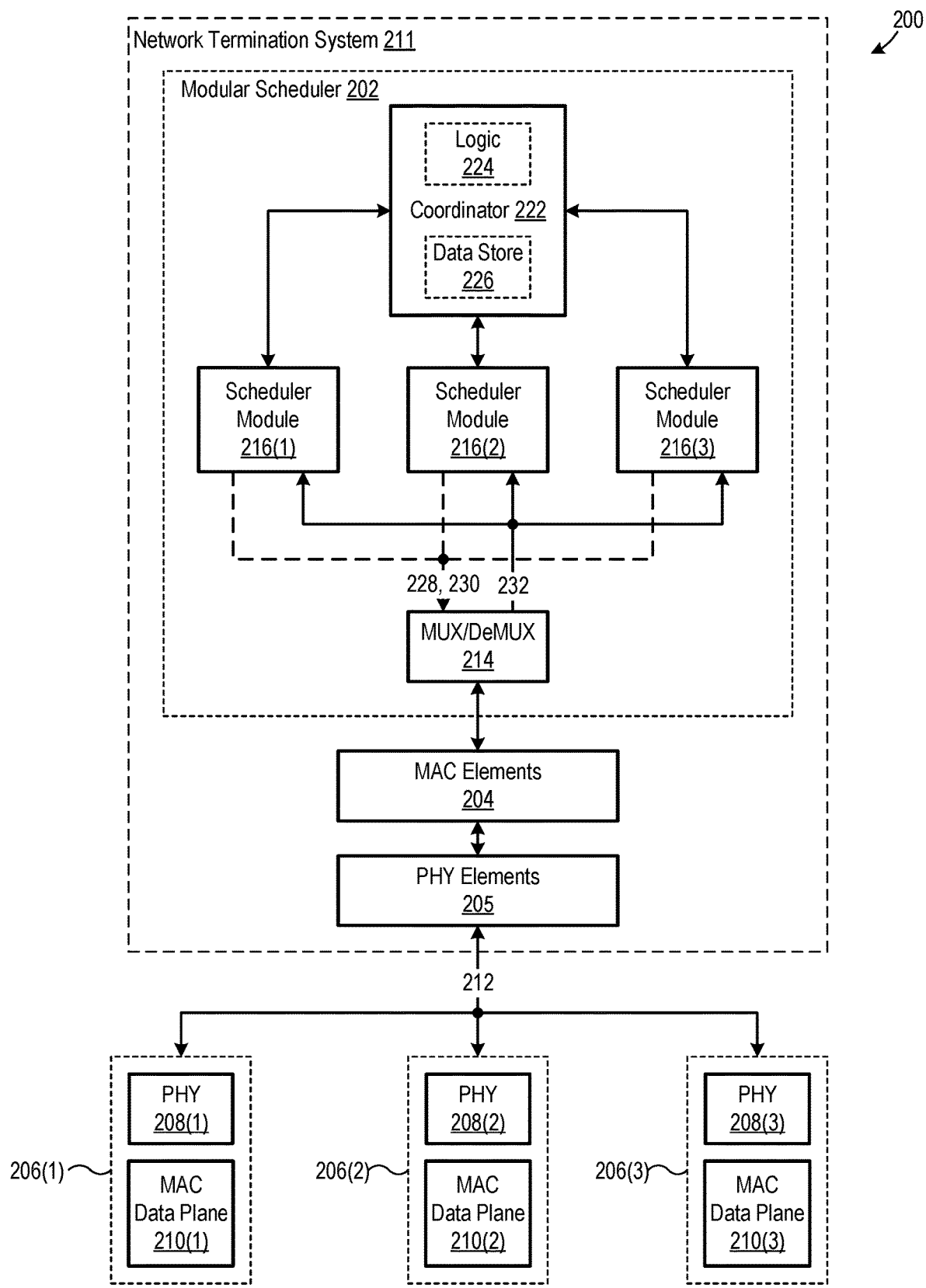
FIG. 2 is a block diagram of a communication network including a modular scheduler, according to an embodiment.

FIG. 2 is a block diagram of a communication network 200 including a modular scheduler 202, MAC elements 204, PHY elements 205, and termination devices 206(1), 206(2), and 206(3). In this document, specific instances of an item may be referred to by use of a numeral in parentheses (e.g., termination device 206(1)) while numerals without parentheses refer to any such item (e.g., termination devices 206). Modular scheduler 202, MAC elements 204, and PHY elements 205 are part of a network termination system 211. In some embodiments, network termination system 211 includes, or is part of, a modem termination system, a digital subscriber line access multiplexer (DSLAM), an optical line terminal (OLT), a cellular wireless communication core (e.g., an evolved packet core (EPC), a fifth generation (5G) cellular wireless communication core, and/or a sixth generation (6G) cellular wireless communication core), a satellite wireless communication ground station, and/or the like. Network termination system 211 can (and typically will) include additional elements, such as to support additional OSI stack layers, but these additional elements are not shown in FIG. 2 for illustrative clarity. MAC elements 204 encompass MAC sublayer elements in addition to modular scheduler 202, and the configuration of MAC elements 204 is implementation dependent. For example, in some embodiments, such as discussed below with respect to FIG. 5, multiple MAC control planes share a common MAC data plane, while in some other embodiments, such as discussed below with respect to FIGS. 6 and 7, each MAC control plane is associated with a respective MAC data plane.

PHY elements 205 include one or more PHY layers, and the number of PHY layers is implementation dependent. For example, in some embodiments, such as discussed below with respect to the FIGS. 5 and 6, multiple MAC planes share a common PHY layer, while in some other embodiments, such as discussed below with respect to FIG. 7, each MAC plane is associated with a respective PHY layer.

Communication medium 212 communicatively couples network termination system 211 with each termination device 206, such as in a point-to-multi-point topology. Communication medium 212 may be a single communication medium, or communication medium 212 may include two or more different communication mediums which need not be of the same type. Examples of communication medium 212 include, but are not limited to, one or more of an optical cable, an electrical cable (e.g., a coaxial electrical cable, a telephone electrical cable, an Ethernet electrical cable, and/or a power line electrical cable), and free space (e.g., for transmission of optical communication signals or radio frequency wireless communication signals). Communication medium 212 may also include supporting elements such as amplifiers, splitters, repeaters, conversion devices (e.g., fiber nodes, remote terminals, and/or optical network units (ONUs)), etc., without departing from the scope hereof.

Each termination device 206 includes a respective PHY layer 208 and a respective MAC data plane 210. Each termination device 206 can (and typically will) include additional elements, such as to support additional OSI stack layers, but these additional elements are not shown in FIG. 2 for illustrative clarity. Each termination device 206 need not have the same configuration. In some embodiments, one or more of termination devices 206 is a modem, and examples of possible modems include, but are not limited to, a cable modem, a digital subscriber line (DSL) modem, and a wireless modem (e.g., for interfacing one or more clients with a Wi-Fi wireless communication link, cellular wireless communication link, satellite wireless communication link, Bluetooth wireless communication link, and/or LoRa wireless communication link). However, termination devices 206 are not limited to being modems, and one or more of termination devices 206 could instead be another type of termination device, including but not limited to, an ONU, an optical network termination (ONT), a fiber node, a remote terminal, a wireless base station, and/or a gateway. Termination devices 206 could be free-standing devices, or termination devices 206 could be incorporated in one or more additional devices (not shown). For example, in some embodiments, termination devices 206 are integrated within respective computing devices, communication devices, network devices, entertainment devices, Internet of Things (IoT) devices, etc. Although FIG. 2 illustrates communication network 200 as including three termination devices 206, the number of termination devices 206 of communication network 200 could vary, as long as communication network 200 includes at least one termination device 206.

Examples of data transmission protocols supported by communication network 200 include, but are not limited to, a cable data transmission communication protocol (e.g., a DOCSIS data transmission protocol), a DSL data transmission protocol, an optical data transmission protocol (e.g., an Ethernet passive optical network (EPON) data transmission protocol, a radio frequency of over glass (RFOG or RFoG) data transmission protocol, or a Gigabit-capable passive optical network (GPON) data transmission protocol), a cellular wireless data transmission protocol operating in licensed or unlicensed radio frequency spectrum (e.g., a long terminal evolution (LTE) data transmission protocol, a 5G data transmission protocol, or a 6G data transmission protocol), a Wi-Fi wireless data transmission protocol, a satellite wireless data transmission protocol, a Bluetooth wireless data transmission protocol, a Universal Series Bus (USB)

data transmission protocol, a home networking data transmission protocol (e.g., a Multi-Media over Coax (MoCA) data transmission protocol or HomePNA (G.hn) data transmission protocol), and/or any variations, improvements, and/or evolutions thereof. Additionally, communication network 200 may support transmission of data packets according to two or more different data transmission protocols, including two or more of the aforesaid data transmission protocols, via communication medium 212.

Modular scheduler 202 includes a MUX/DeMUX 214, a plurality of scheduler modules 216, and a coordinator 222. Although FIG. 2 depicts modular scheduler 202 as including three scheduler modules 216, the number of scheduler modules 216 included in modular scheduler 202 may vary. Additionally, in some embodiments, modular scheduler 202 may dynamically instantiate and/or dynamically terminate scheduler modules 216, as discussed above.

Each scheduler module 216 is configured to schedule upstream and downstream transmission of a respective class of data packets via communication medium 212, according to an allocation of resources of communication medium 212 specified by coordinator 222. Classes of data packets handled by respective scheduler modules 216 may be differentiated, for example, by associated data transmission protocol, associated data flow, and/or associated termination device 206. For example, in a particular embodiment, scheduler module 216(1) schedules transmission of data packets requiring default scheduling, scheduler module 216(2) schedules transmission of data packets requiring low latency scheduling, and scheduler module 216(3) schedules transmission of data packets associated with wireless base station Xhaul, where "Xhaul" could be backhaul, fronthaul, midhaul, etc. As another example, in another embodiment, scheduler module 216(1) schedules transmission of data packets associated with a first wireline data transmission protocol, scheduler module 216(2) schedules transmission of data packets associated with a second wireline data transmission protocol, and scheduler module 216(3) schedules transmission of data packets associated with a wireless data transmission protocol. As yet another example, in some embodiments, scheduler module 216(1) is configured to schedule data packets associated with termination device 206(1), scheduler module 216(2) is configured to schedule data packets associated with termination device 206(2), and scheduler module 216(3) is configured to schedule data packets associated with termination device 206(3).

Coordinator 222 includes logic 224 and data store 226. Data store 226 includes, for example, one or more of a memory, a database, a shared file, and a message bus. Logic 224 is configured to allocate resources of communication medium 212, such as transmission time of communication medium 212, transmission frequency or wavelength of communication medium 212, and/or transmission phase of communication medium 212, to each scheduler module 216 by writing respective grants in data store 226 for each scheduler module. Examples of possible grants include, but are not limited to, channel grants, slot grants, mini-slot grants, and time slice grants. Each scheduler module 216 need not receive the same type of grant from coordinator 222. Logic 224 writes grants, for example, according to allocation parameters which may either be static or dynamic. The allocation parameters are configured, for example, at least partially based on predefined business logic, real time requests from scheduler modules 216, and/or machine learning prediction of future scheduling needs.

As one example of operation of coordinator 222, assume that scheduler module 216(1) is configured to handle data packets requiring default scheduling and that scheduler module 216(2) is configured to handle data packets requiring low latency handing. Logic 224 may write respective grants in data store 226 for each of scheduler modules 216(1) and 216(2) in a manner which give scheduler module 216(2) priority over scheduler module 216(1) for resources of communication medium 212, thereby helping minimize latency in transmission of data packets requiring low latency. As another example, assume that scheduler modules 216(1), 216(2), and 216(3) schedule transmission of data packets associated with termination devices 206(1), 206(2), and 206(3), respectively. Additionally, assume that (1) a customer associated with termination device 206(1) subscribes to a premium service tier, (2) a customer associated with termination device 206(2) subscribes to a mid-level service tier, and (3) a customer associated with termination device 206(3) subscribes to an economy service tier. Logic 224 may write respective grants in data store 226 for each of scheduler modules 216(1)-216(3) in a manner which give scheduler module 216(1) priority over each of scheduler modules 216(2) and 316(3) for resources of communication medium 212, thereby providing premium service to termination device 206(1). Additionally, logic 224 may write respective grants in data store 226 for each of scheduler modules 216(1)-216(3) in a manner which gives scheduler module 216(2) priority over scheduler module 216(3) for resources of communication medium 212, thereby providing mid-level service to termination device 206(2).

Each scheduler module 216 is configured to schedule transmission of data packets via communication medium 212 in accordance with respective grants for the scheduler module written by logic 224 in data store 226. For example, in some embodiments, each scheduler module 216 is configured to send respective uplink grants from data store 226 to appropriate termination devices 206, to schedule uplink data transmission via communication medium 212. MUX/DeMUX 214 is configured to direct uplink grants 228 (and other control messages) from scheduler modules 216 to termination devices 206 via MAC elements 204, PHY elements 205, and communication medium 212. Additionally, in certain embodiments, each scheduler module 216 is also configured to send respective downlink grants 230 from data store 226 to an appropriate MAC data plane (not shown) of MAC elements 204, or to a common MAC data plane (not shown) of MAC elements 204, to schedule downlink data transmission via communication medium 212.

MUX/DeMUX 214 is additionally configured to direct requests 232 for uplink data transmission grants (and other control messages) from termination devices 206 to an appropriate scheduler module 216 at least partially based on one or more attributes of the requests. For example, assume again that scheduler module 216(1) is configured to schedule transmission of data packets requiring default scheduling and that scheduling module 216(2) is configured to schedule transmission of data packets requiring low latency scheduling. In this example, MUX/DeMUX 214 would direct a request 232 for scheduling a data packet requiring default scheduling to scheduler module 216(1), and MUX/DeMUX 214 would direct a request 232 for scheduling a data packet requiring low latency scheduling to scheduler module 216(2). In some embodiments, MUX/DeMUX 214 determines which scheduler module 216 to direct requests 232 to at least partially based on a data flow identifier, a MAC type, and identity or type of a termination device, and/or an identity or type of an application. The logical location of MUX/De- MUX 214 in network termination system 211 may vary depending on the specific configuration of MAC elements 204 and PHY elements 205.

Figure 3:
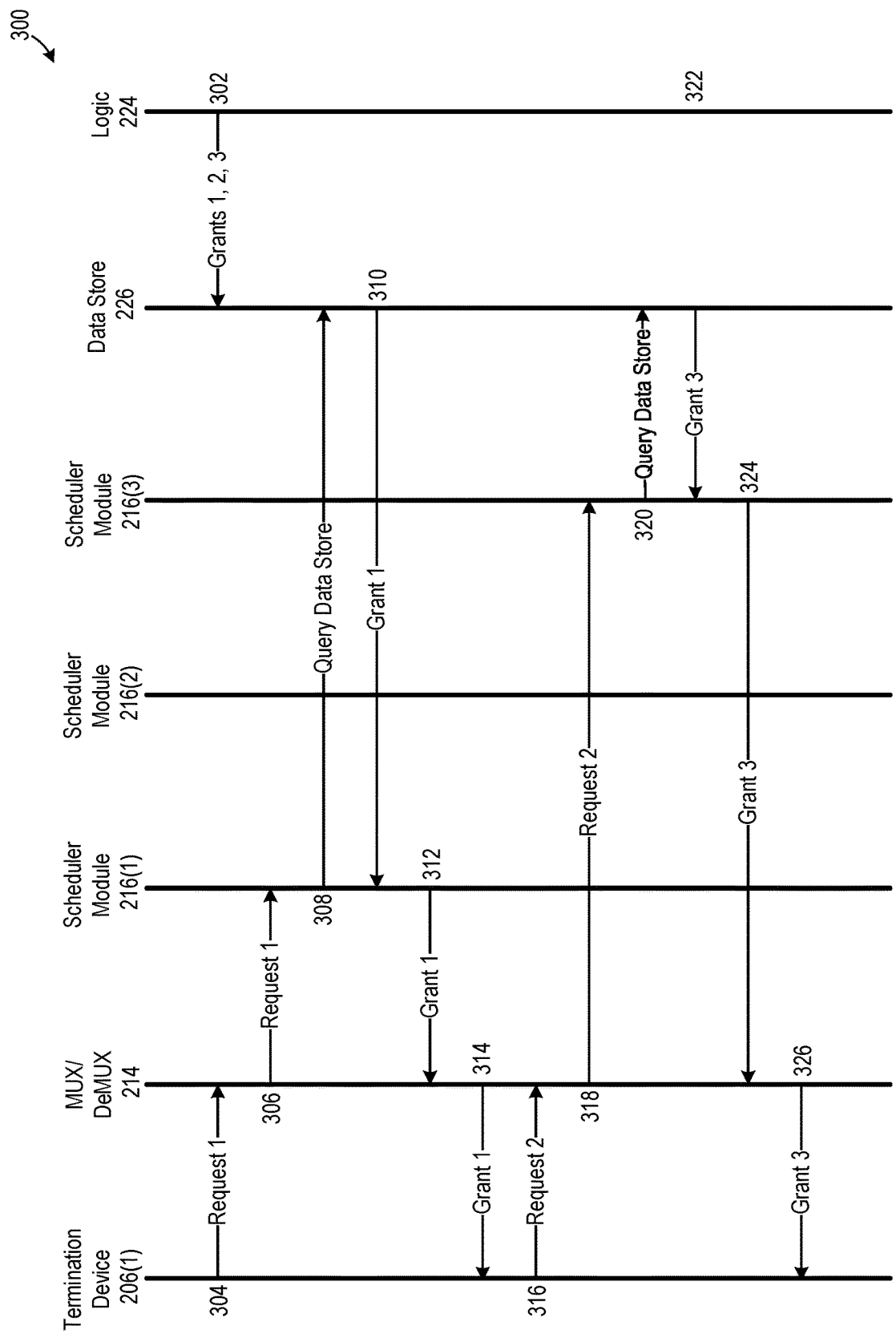
FIG. 3 is a data flow diagram illustrating one example of operation of the FIG. 2 modular scheduler.

FIG. 3 is a data flow diagram 300 illustrating one example of operation of modular scheduler 202 in scheduling uplink data transmission grants. It is understood, however, that modular scheduler 202 is not limited to operating according to the FIG. 3 example. Diagram 300 includes vertical lines logically representing each of termination device 206(1), MUX/DeMUX 214, scheduler module 216(1), scheduler module 216(2), scheduler module 216(3), data store 226, and logic 224. Termination device 206(2), termination device 206(3), MAC elements 204, and PHY elements 205 are not shown in FIG. 3.

In a step 302, logic 224 writes Grants 1, 2, and 3 to data store 226 for scheduler modules 216(1), 216(2), and 216(3), respectively. Logic 224 writes Grants 1, 2, 3, for example, according to allocation parameters which may either be static or dynamic. In a step 304, termination device 206(1) sends a Request 1 for a grant for uplink data transmission to MUX/DeMUX 214. In this example, MUX/DeMUX 214 determines that the data packets associated with Request 1 should be scheduled by scheduler module 216(1), and MUX/DeMUX 214 therefore forwards Request 1 to scheduler module 216(1) in a step 306. In response to receiving Request 1, scheduler module 216(1) queries data store 226 for a grant in step 308, and scheduler module 216(1) reads Grant 1 from data store 226 in step 310. Scheduler module 216(1) sends Grant 1 to MUX/DeMUX 214 in a step 312, and MUX/DeMUX 214 sends Grant 1 to termination device 206(1) in a step 314 via MAC elements 204, PHY elements 205, and communication medium 212 (not shown in FIG. 3). Uplink data transmission in response to Request 1 is scheduled at the conclusion of step 314.

In a step 316, termination device 206(1) sends a Request 2 for a grant for uplink data transmission to MUX/DeMUX 214. In this example, MUX/DeMUX 214 determines that the data packets associated with Request 2 should be scheduled by scheduler module 216(3), and MUX/DeMUX 214 therefore forwards Request 2 to scheduler module 216(3) in a step 318. In response to receiving Request 2, scheduler module 216(3) queries data store 226 for a grant in step 320, and scheduler module 216(3) reads Grant 3 from data store 226 in step 322. Scheduler module 216(3) sends Grant 3 to MUX/DeMUX 214 in a step 324, and MUX/DeMUX 214 sends Grant 3 to termination device 206(1) in a step 326 via MAC elements 204, PHY elements 205, and communication medium 212 (not shown in FIG. 3). Uplink data transmission in response to Request 2 is scheduled at the conclusion of step 326.

Referring again to FIG. 2, the elements of modular scheduler 202 could be partially or fully combined without departing from the scope hereof. Additionally, one or more elements of modular scheduler 202 could be split in two or more sub-elements. For example, each of scheduler modules 216 could be split into a respective uplink scheduler module and a respective downlink scheduler module. Furthermore, the elements of modular scheduler 202 need not be co-packaged or even disposed at a common location. Moreover, modular scheduler 202 could be partially or fully combined with one or more other elements, such as MAC elements 204 and/or PHY elements 205.

Figure 4:
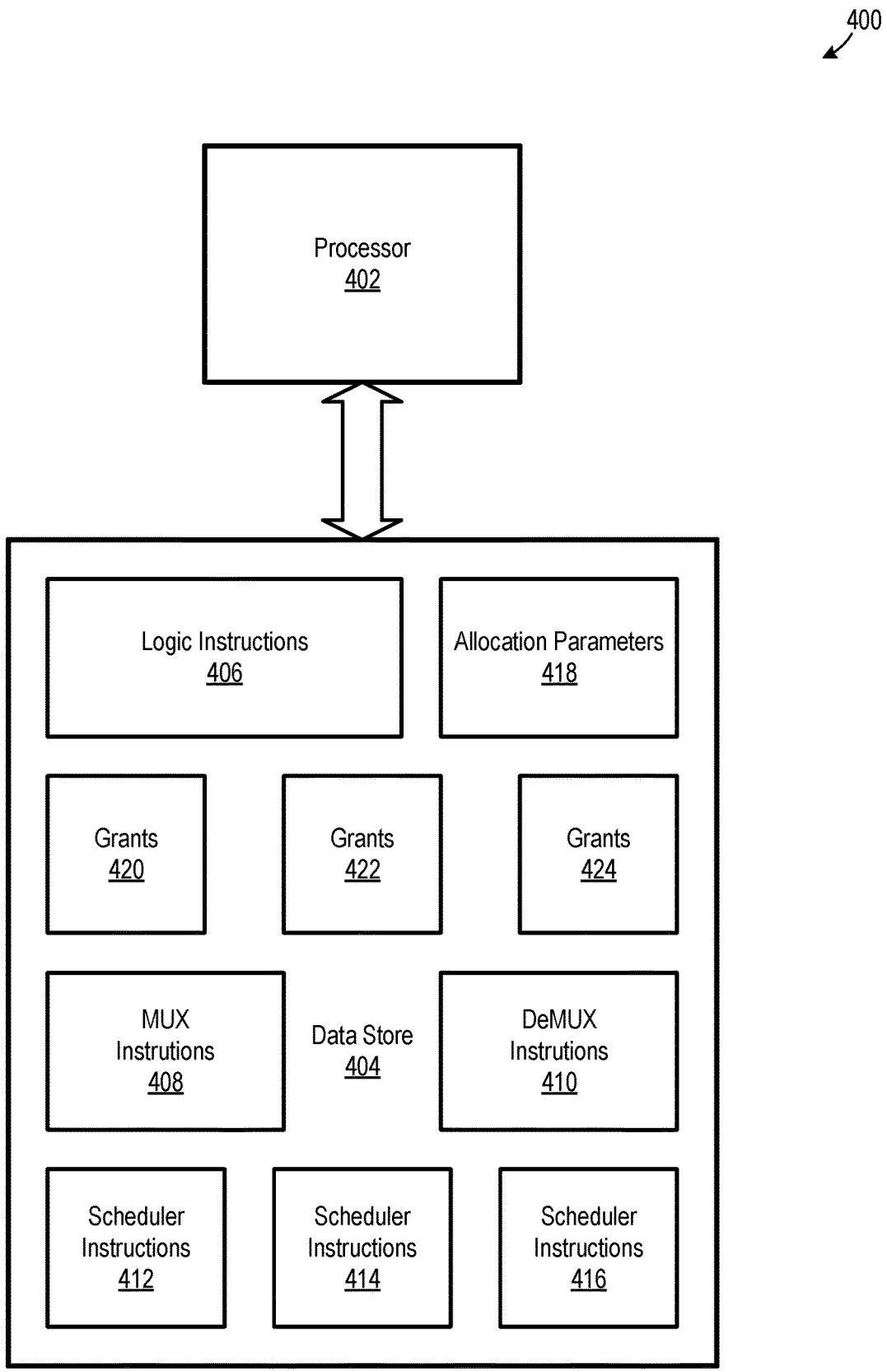
FIG. 4 is a block diagram of one possible embodiment of the FIG. 2 modular scheduler.

In some embodiments, the elements of modular scheduler 202 are implemented by digital electronics and/or analog electronics. For example, in particular embodiments, the elements of modular scheduler 202 are at least partially implemented by purpose-built physical devices, such as application-specific integrated circuits (ASICs). As another example, in certain embodiments, the elements of modular scheduler 202 are software based, virtualized, and/or cloud native. For instance, some embodiments of modular scheduler 202 are at least partially implemented by one or more processors executing instructions, such as in the form of firmware and/or software, stored in one or more memories, to perform the functions of modular scheduler 202. For example, FIG. 4 is a block diagram of a modular scheduler 400, which is one possible embodiment of modular scheduler 202 where modular scheduler 202 is embodied by a processor executing instructions stored in memory. Modular scheduler 400 includes a processor 402 communicatively coupled to a data store 404. Although processor 402 and data store 404 are illustrated as being single elements, each of processor 402 and data store 404 could be implemented by multiple sub-elements that need not by implemented by common hardware or even implemented at a common location. For example, each of processor 402 and data store 404 could be implemented in a distributed computing system, such as in a cloud computing system.

Data store 404 includes logic instructions 406, multiplexing (MUX) instructions 408, demultiplexing (DeMUX) instructions 410, scheduler instructions 412, scheduler instructions 414, and scheduler instructions 416. Data store 404 additionally includes allocation parameters 418 and grants 420, 422, and 424. Processor 402 is configured to execute logic instructions 406 in view of allocation parameters 418 to perform the functions of logic 224 and thereby write grants 420, 422, and 424 to data store 404. Grants 420, 422, and 424 are for scheduler modules 216(1), 216(2), and 216(3), respectively. Allocation parameters 418 at least partially specify how resources of communication medium 212 are to be allocated among scheduler modules 216(1)-216(3). Processor 402 is additionally configured to execute scheduler instructions 412, 414, and 416 to implement scheduler modules 216(1), 216(2), and 216(3), respectively. Furthermore, processor 402 is configured to execute MUX instructions 408 and DeMUX instructions 410 to implement the multiplexing and demultiplexing functions of MUX/DeMUX 214, respectively.

Figure 5:
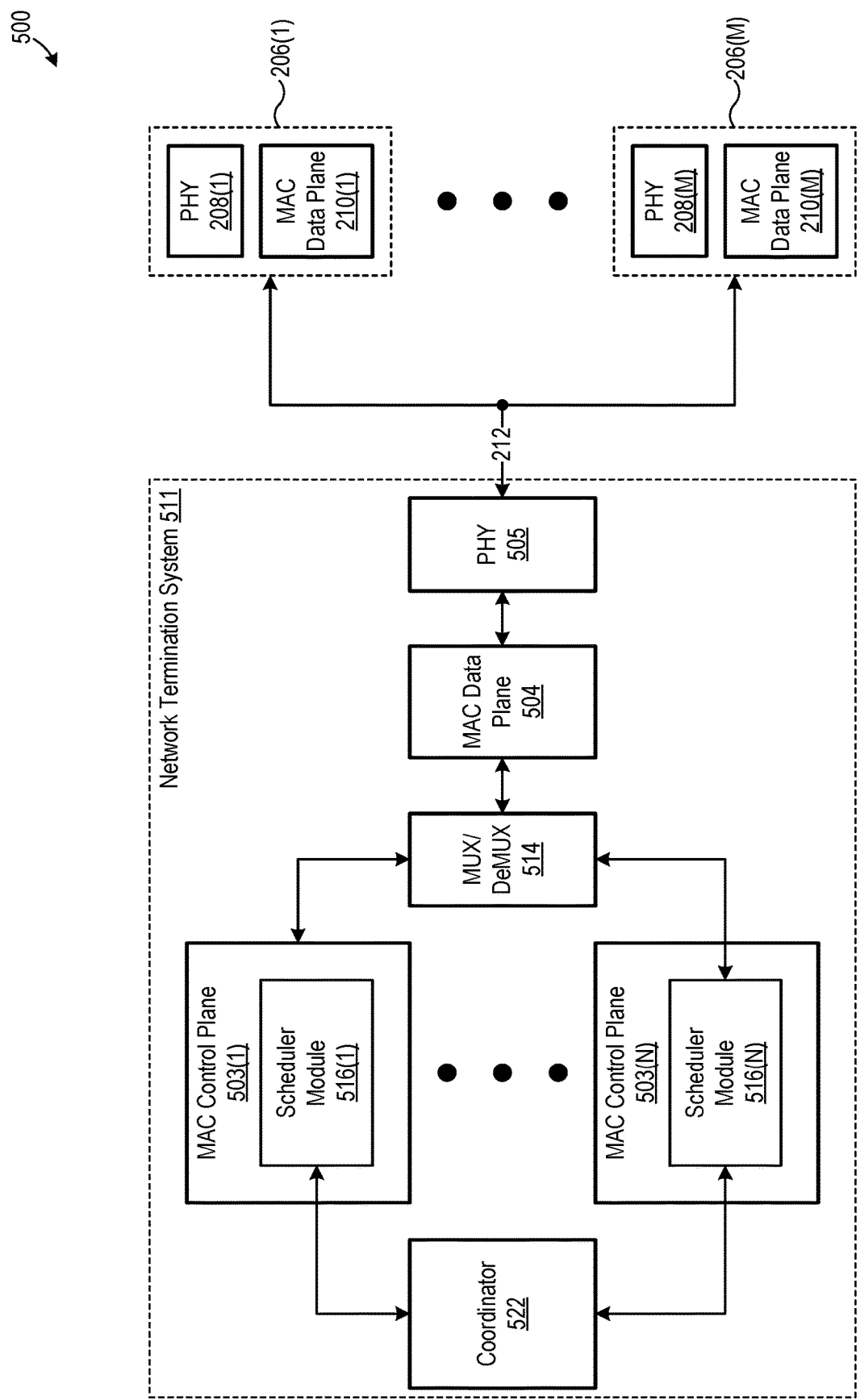
FIG. 5 is a block diagram of an embodiment of the FIG. 2 communication network where a network termination system includes a shared medium access control data plane and a shared physical layer.
Figure 6:
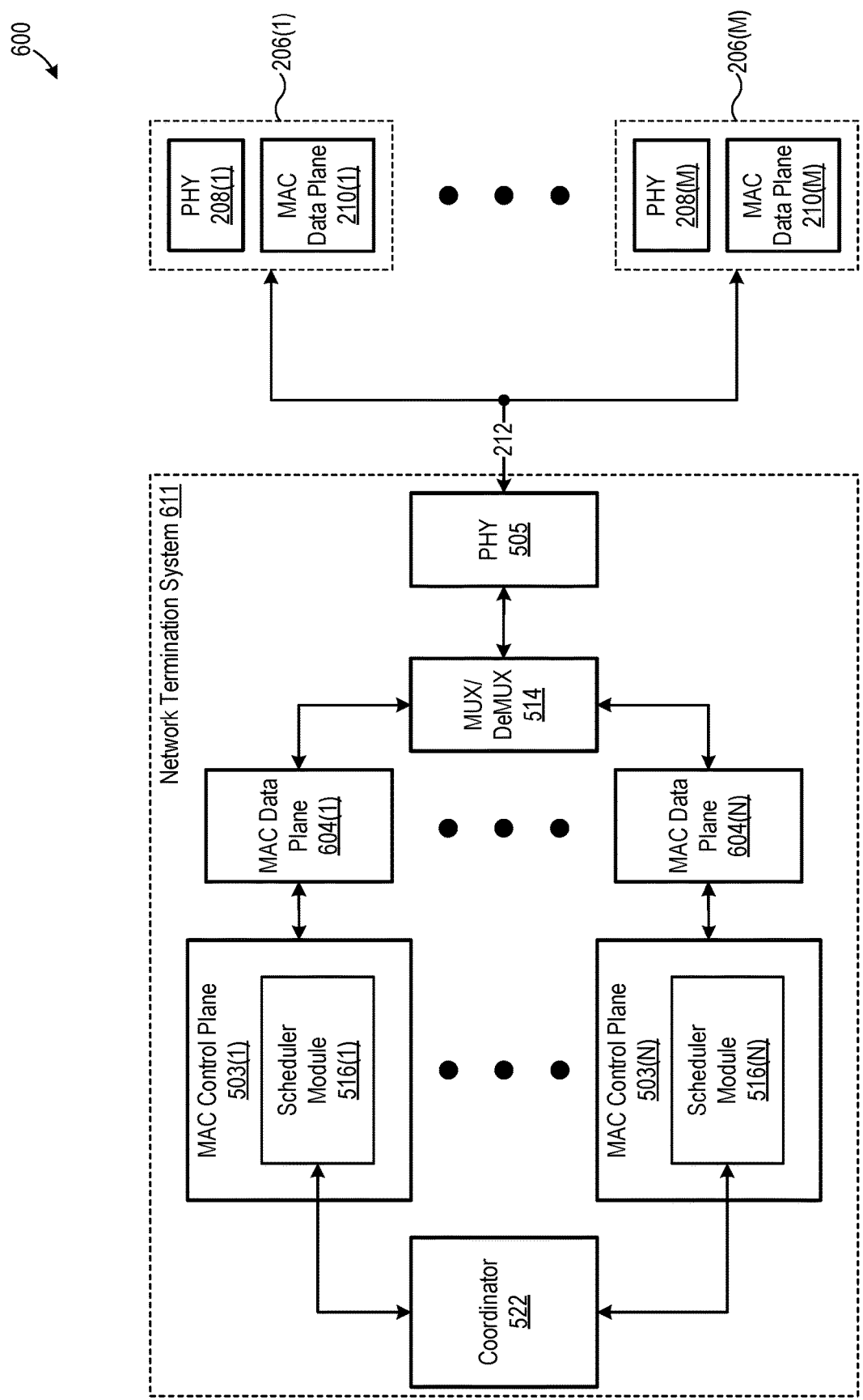
FIG. 6 is a block diagram of an alternate embodiment of the FIG. 5 communication network where a network termination system includes a plurality of medium access control data planes.
Figure 7:
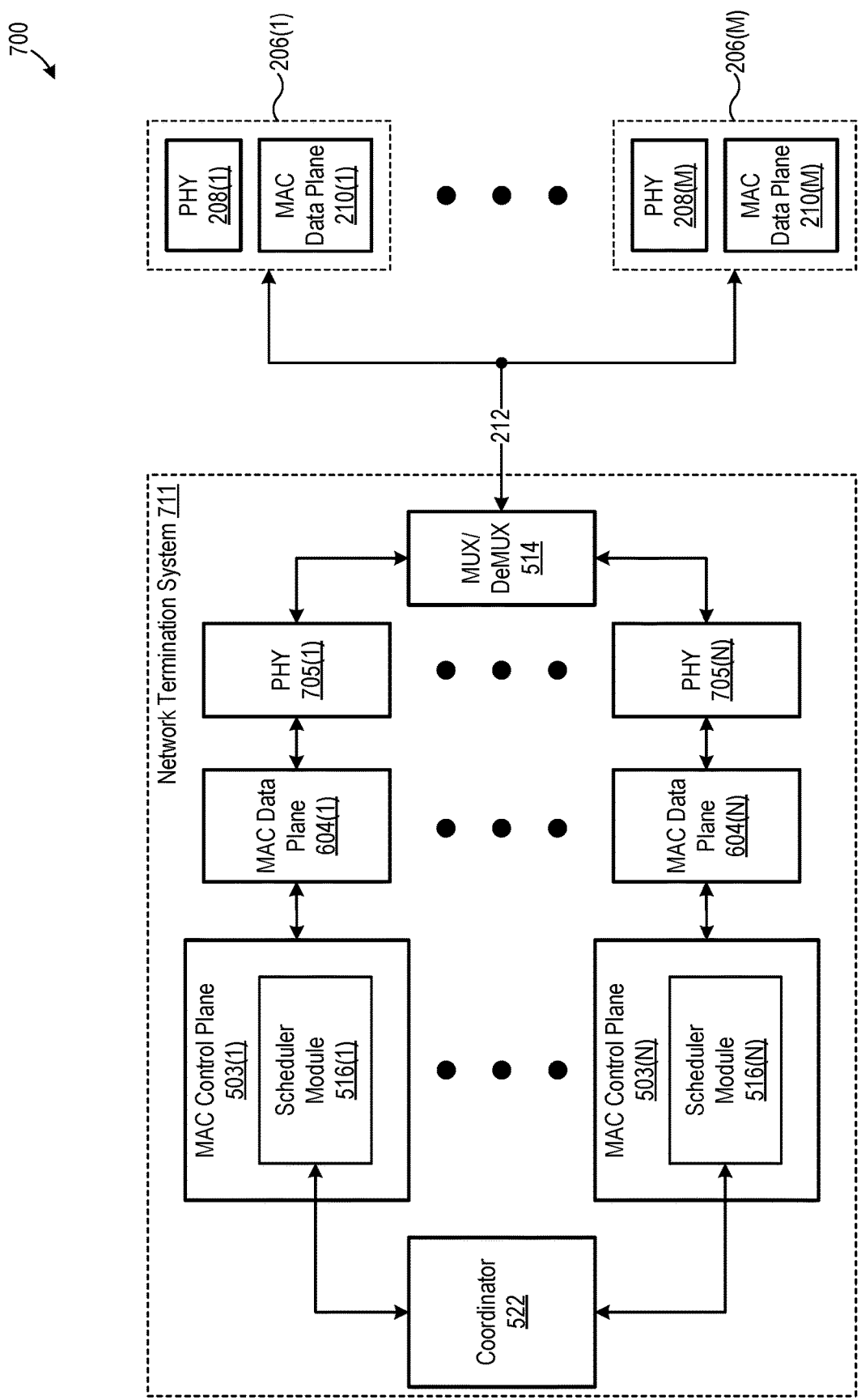
FIG. 7 is a block diagram of an alternate embodiment of the FIG. 6 communication network where a network termination system includes a plurality of physical layers.

Discussed below with respect to FIGS. 5-7 are several possible embodiments of network termination system 211. It is understood, though, that network termination system 211 is not limited to example embodiments of FIGS. 5-7.

FIG. 5 is a block diagram of a communication network 500 including a network termination system 511, an instance of communication medium 212, and M instances of termination devices 206, where M is an integer greater than or equal to one. Network termination system 511 of FIG. 5 is an embodiment of network termination system 211 of FIG. 2, and network termination system 511 includes a physical layer 505, a MAC data plane 504, a MUX/DeMUX 514, N MAC control planes 503, and a coordinator 522, where N is an integer greater than or equal to one. N and M need not have the same values. Physical layer 505, which is an embodiment of physical elements 205 of FIG. 5, is logically coupled between communication medium 212 and MAC data plane 504, and physical layer 505 is shared by all MAC control planes 503. Accordingly, physical layer 505 is configured to facilitate physical transmission of all data packets through communication medium 212 flowing between network termination system 511 and one or more termination devices 206.

MAC data plane 504 is logically coupled between physical layer 505 and MUX/DeMUX 514, and MAC data plane 504 is shared by all MAC control planes 503. Consequently, MAC data plane 504 provides flow control for all data packets through communication medium 212 flowing between network termination system 511 and one or more termination devices 206. MUX/DeMUX 514 is an embodiment of MUX/DeMUX 214 of FIG. 2, and MUX/DeMUX 514 is logically coupled between MAC data plane 504 and each MAC control plane 503. MUX/DeMUX 514 directs grants, requests, and other control messages between MAC control planes 503 and MAC data plane 504. Each MAC control plane 503 includes a respective scheduler module 516, and scheduler modules 516 are an embodiment of scheduler modules 216 of FIG. 2. Each MAC control plane 503 can, and typically will, include additional elements that are not depicted in FIG. 5, such as one or more elements configured to provide security services, authentication services, provisioning services, etc. In some embodiments, two or more MAC control planes 503 are configured to have different authentication provisions and/or different provisioning provisions. Coordinator 522 is an embodiment of coordinator 222 of FIG. 2.

Coordinator 522, scheduler modules 516, and MUX/DEMUX 514 collectively form an embodiment of modular scheduler 202. Accordingly, each scheduler module 516 is configured to schedule transmission of data packets via communication medium 212 in accordance with respective grants generated by coordinator 522, in a manner like that discussed above with respect to scheduler modules 216 and coordinator 222. The fact that MAC control planes 503 share a common MAC data plane 504 and a common physical layer 505 limits network termination system 511 to supporting a single data transmission protocol, but network termination system 511 can nevertheless schedule data packets according to associated data flow and/or associated termination device 206. For example, two or more scheduler modules 516 could be configured to schedule data packets associated with different respective data flows, and two or more scheduler modules 516 could be configured to schedule data packets associated with different respective termination devices 206.

FIG. 6 is a block diagram of a communication network 600, which is an alternate embodiment of communication network 500 of FIG. 5 where network termination system 511 is replaced with a network termination system 611. Network termination system 611 differs from network termination system 511 in that (1) shared MAC data plane 504 is replaced with a respective MAC data plane 604 for each MAC control plane 503 and (2) the logical location of MUX/DeMUX 514 is moved to between MAC data planes 604 and physical layer 505. MUX/DeMUX 514 directs grants, requests, and other control messages between MAC data planes 604 and physical layer 505, in network termination system 611.

Each MAC control plane 503 and associated MAC data plane 604 form a respective MAC sublayer (not labeled) in network termination system 611. Accordingly, network termination system 611 includes N MAC sublayers, each with its own scheduler module 516. Scheduler modules 516 and coordinator 522 function in the same manner as scheduler modules 216 and coordinator 222. The fact that network termination system 611 includes a respective MAC data plane 604 for each MAC control plane 503 enables network termination system 611 to support multiple encoding schemes for MAC messages, as well as multiple timing schemes. Additionally, network termination system 611 may support multiple data transmission protocols, as long as each data transmission protocol is compatible with physical layer 505. For example, two or more MAC sublayers may be support different frame encryption methods. As another example, two or more MAC sublayers may support different versions of a common data transmission protocol, such as different versions of a DOCSIS data transmission protocol. Some embodiments of network termination system 611 are configured to support a respective downlink control channel for each MAC data plane 604.

FIG. 7 is a block diagram of a communication network 700, which is an alternate embodiment of communication network 600 of FIG. 6 where network termination system 611 is replaced with a network termination system 711. Network termination system 711 differs from network termination system 611 in that (1) shared physical layer 505 is replaced with a respective physical layer 705 for each MAC control plane 503 and MAC data plane 604 pair, and (2) the logical location of MUX/DeMUX 514 is moved to between physical layers 705 and communication medium 212. MUX/DeMUX 514 directs grants, requests, and other control messages between physical layers 705 and communication medium 212, in network termination system 711.

Scheduler modules 516 and coordinator 522 function in the same manner as scheduler modules 216 and coordinator 222. The fact that network termination system 711 includes a respective physical layer 705 for MAC data plane 604 and MAC control plane 503 pair enables network termination system 711 to support essentially any data transmission protocols and any physical layers that are capable of being transmitted by communication medium 212. For example, network termination system 711 could support both a wireline data transmission protocol and a wireless data transmission protocol operating in common radio frequency spectrum and sharing communication medium 212. Some embodiments of network termination system 711 are configured to support a respective control channel for each MAC sublayer with shared channels for data transmission.

Figure 14:
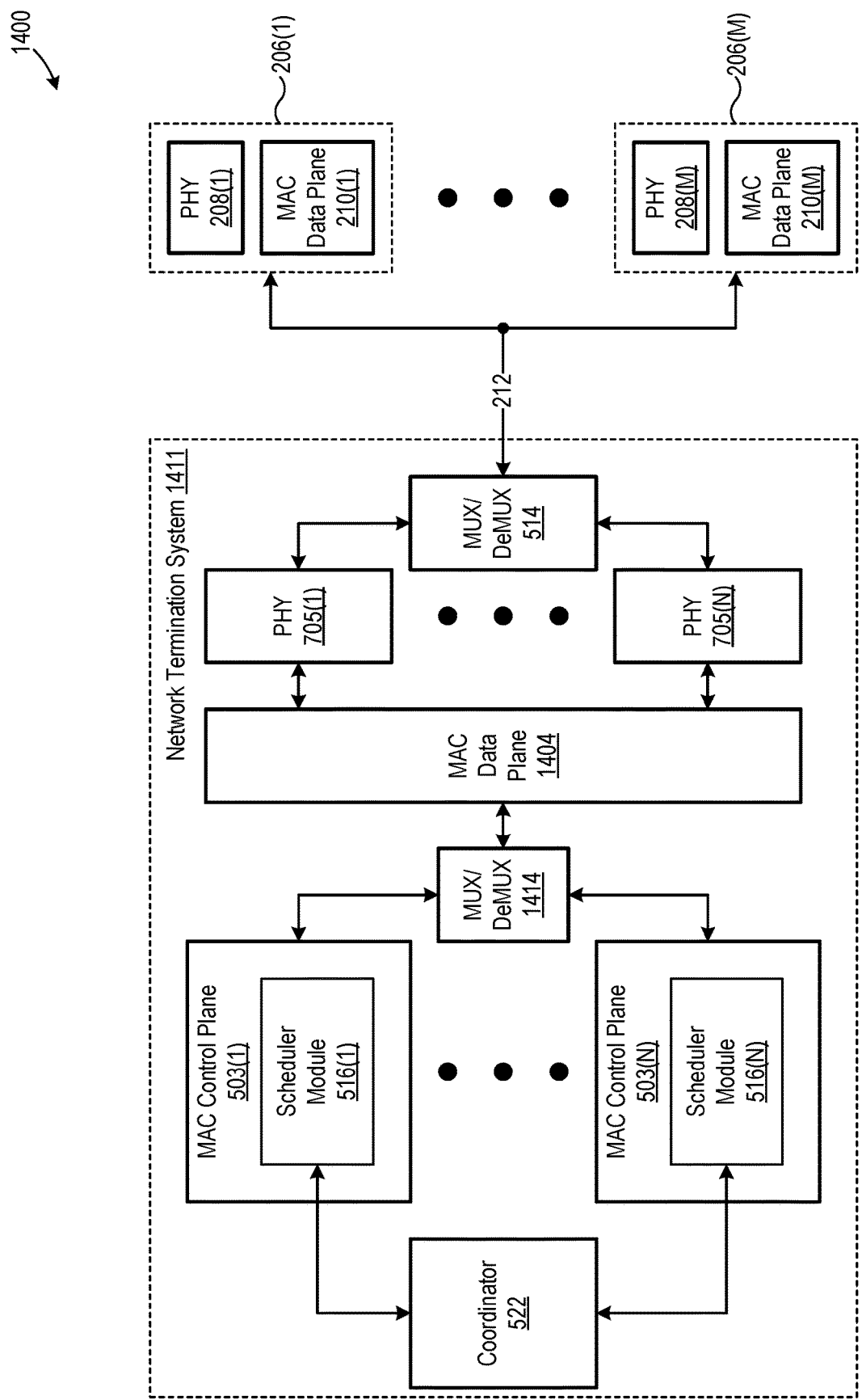
FIG. 14 is a block diagram of an alternate embodiment of the FIG. 7 communication network where a network termination system includes a shared MAC data plane.

FIG. 14 is a block diagram of a communication network 1400, which is an alternate embodiment of communication network 700 of FIG. 7 where network termination system 711 is replaced with a network termination system 1411. Network termination system 1411 differs from network termination system 711 in that (1) the plurality of MAC data planes 604 are replaced with a single shared MAC data plane 1404, and (2) network termination system 1411 includes an additionally MUX/DeMUX 1414 logically coupled between MAC control planes 503 and shared MAC data plane 1404. MUX/DeMUX 1414 directs grants, requests, and other control messages between MAC control planes 503 and shared MAC data plane 1404.

Discussed below with respect to FIGS. 8-11 are several possible embodiments of communication medium 212 and termination devices 206. It is understood, though, that communication networks disclosed herein are not limited to these example embodiments.

Figure 8:
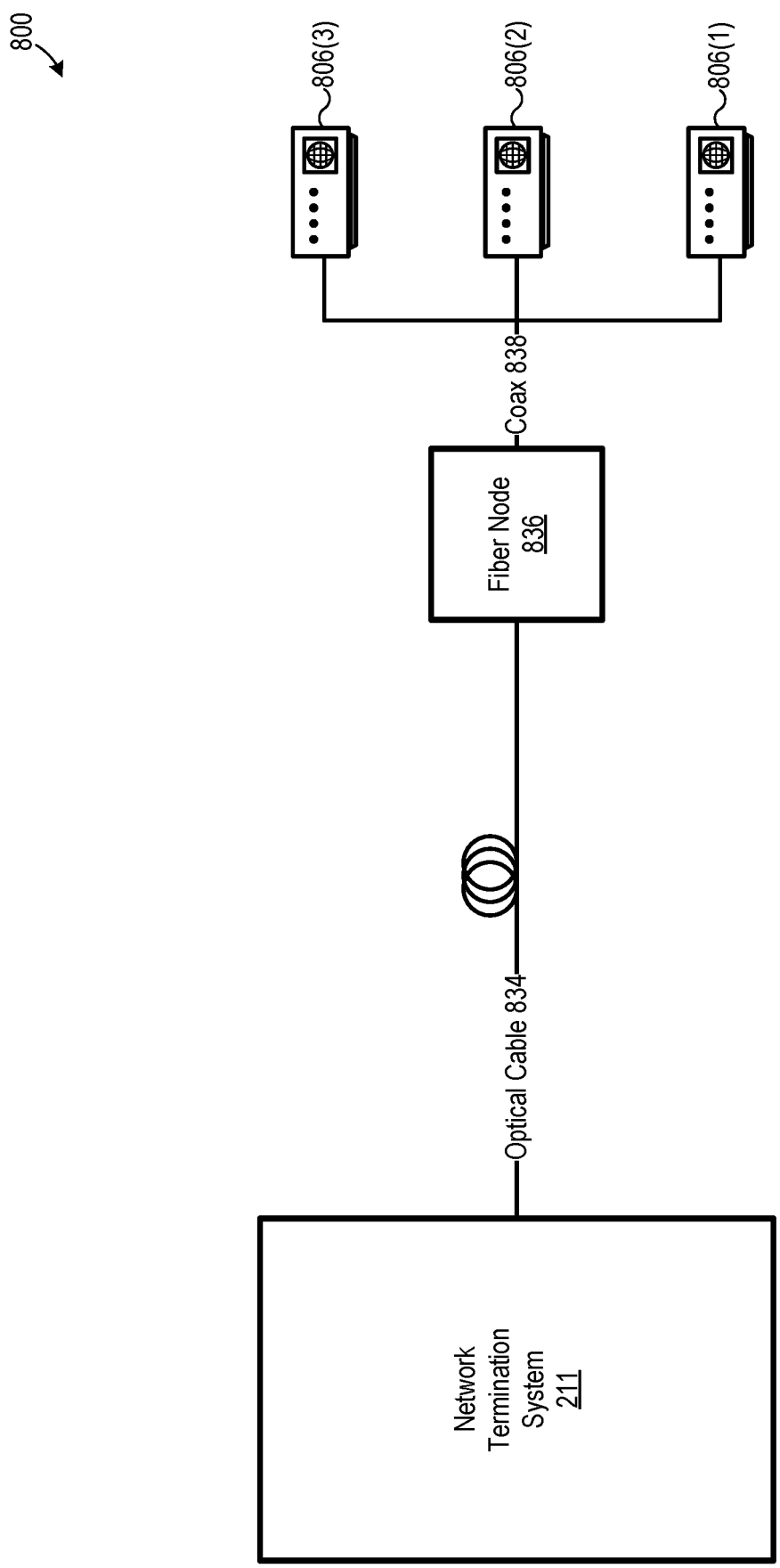
FIG. 8 is a block diagram of an embodiment of the FIG. 2 communication network where a communication medium is embodied by a combination of optical cable, a fiber node, and coaxial electrical cable.

FIG. 8 is a block diagram of a communication network 800, which is an embodiment of communication network 200 of FIG. 2 where communication medium 212 is embodied by a combination of optical cable 834, a fiber node 836, and coaxial electrical cable (coax) 838. Communication network 800 also includes cable modems 806, which are embodiments of termination devices 206 of FIG. 2. Details of network termination system 211 are not shown in FIG. 8. Optical cable 834 communicatively couples network termination system 211 to fiber node 836, and coaxial electrical cable 838 communicatively couples fiber node 836 to each cable modem 806. Fiber node 836 is configured to convert communication signals between the optical domain on optical cable 834 and the electrical domain on coaxial electrical cable 838.

Figure 9:
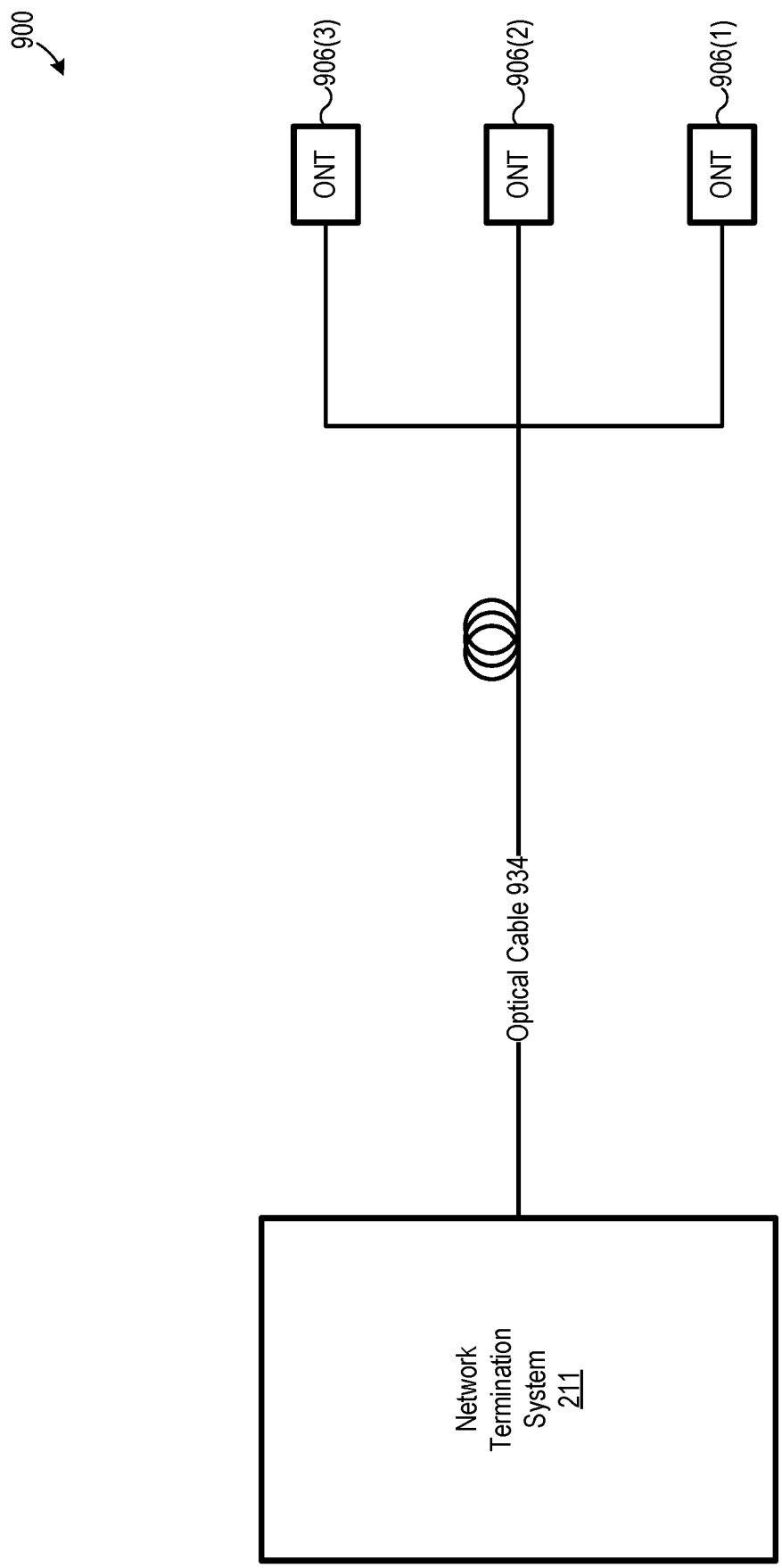
FIG. 9 is a block diagram of an embodiment of the FIG. 2 communication network where a communication medium is embodied by optical cable.

FIG. 9 is a block diagram of a communication network 900, which is an embodiment of communication network 200 of FIG. 2 where communication medium 212 is embodied by optical cable 934. Communication network 900 also includes ONTs 906, which are embodiments of termination devices 206 of FIG. 2. Details of network termination system 211 are not shown in FIG. 9. Optical cable 934 communicatively couples network termination system 211 to each ONT 906.

Figure 10:
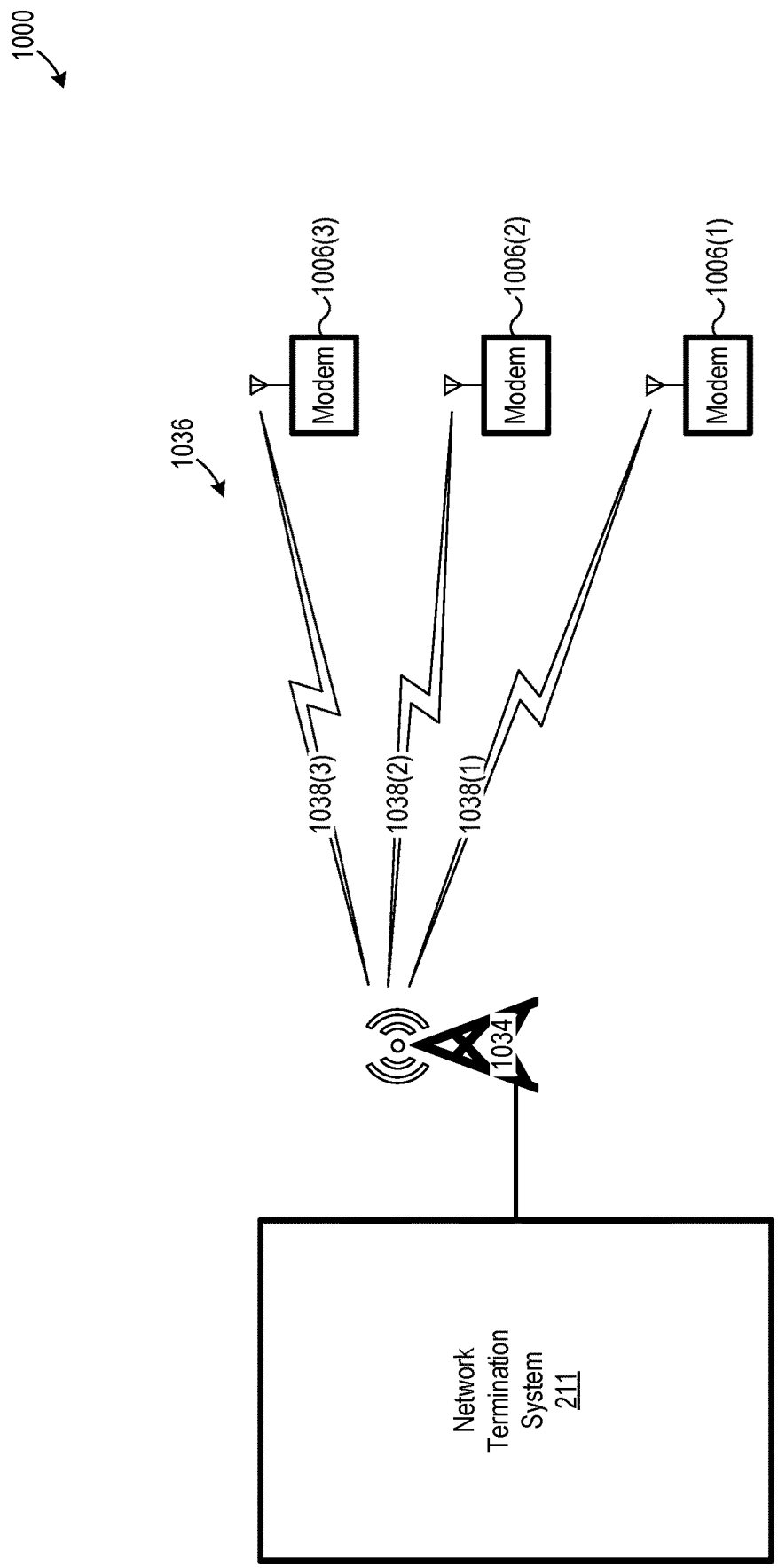
FIG. 10 is a block diagram of an embodiment of the FIG. 2 communication network where a communication medium is embodied by a wireless base station and free space.

FIG. 10 is a block diagram of a communication network 100, which is an embodiment of communication network 200 of FIG. 2 where communication medium 212 is embodied by a wireless base station 1034 and free space 1036. Communication network 1000 also includes wireless modems 1006, which are embodiments of termination devices 206 of FIG. 2. Details of network termination system 211 are not shown in FIG. 10. Wireless base station 1034 is, for example, a cellular wireless base station (e.g., a microcell, a small cell, a microcell, a nanocell, a femtocell, etc.) or a Wi-Fi wireless base station. Data is transmitted through free space 1036 between wireless base station 1034 and wireless modems 1006 via wireless communication signals 1038.

Figure 11:
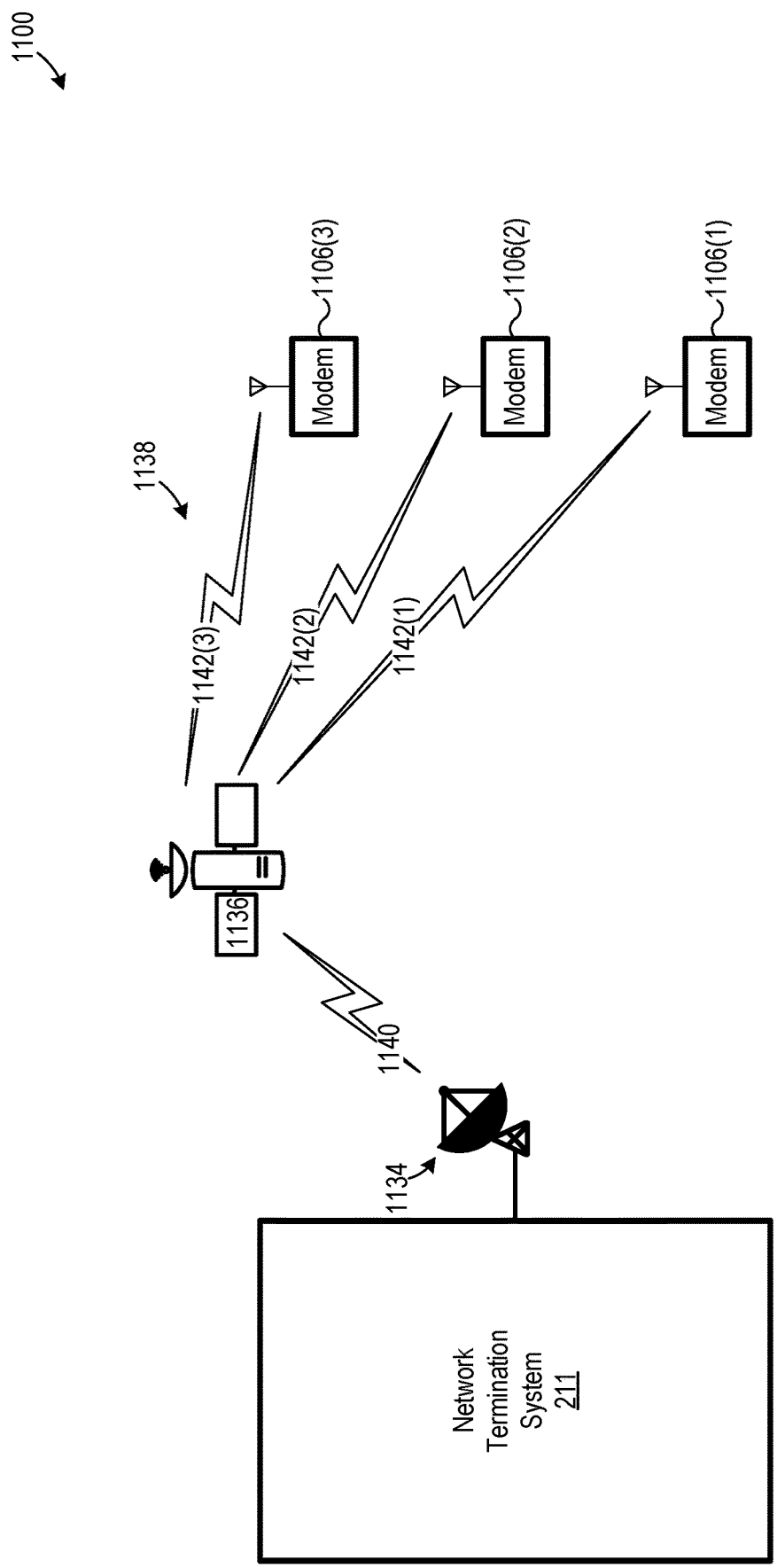
FIG. 11 is a block diagram of an embodiment of the FIG. 2 communication network where a communication medium is embodied by a satellite ground station, a satellite, and free space.

FIG. 11 is a block diagram of a communication network 1100, which is an embodiment of communication network 200 of FIG. 2 where communication medium 212 is embodied by a satellite ground station 1134, a satellite 1136, and free space 1138. Communication network 1100 also includes satellite wireless modems 1106, which are embodiments of termination devices 206 of FIG. 2. Details of network termination system 211 are not shown in FIG. 11. Data is transmitted through free space 1036 between satellite ground station 1134 and satellite 1136 via wireless communication signals 1140, and data is transmitted between satellite 1136 and satellite wireless modems 1106 through free space 1138 via wireless communication signals 1142. Accordingly, satellite 1136 relays data between satellite ground station 1134 and satellite wireless modems 1106.

Figure 12:
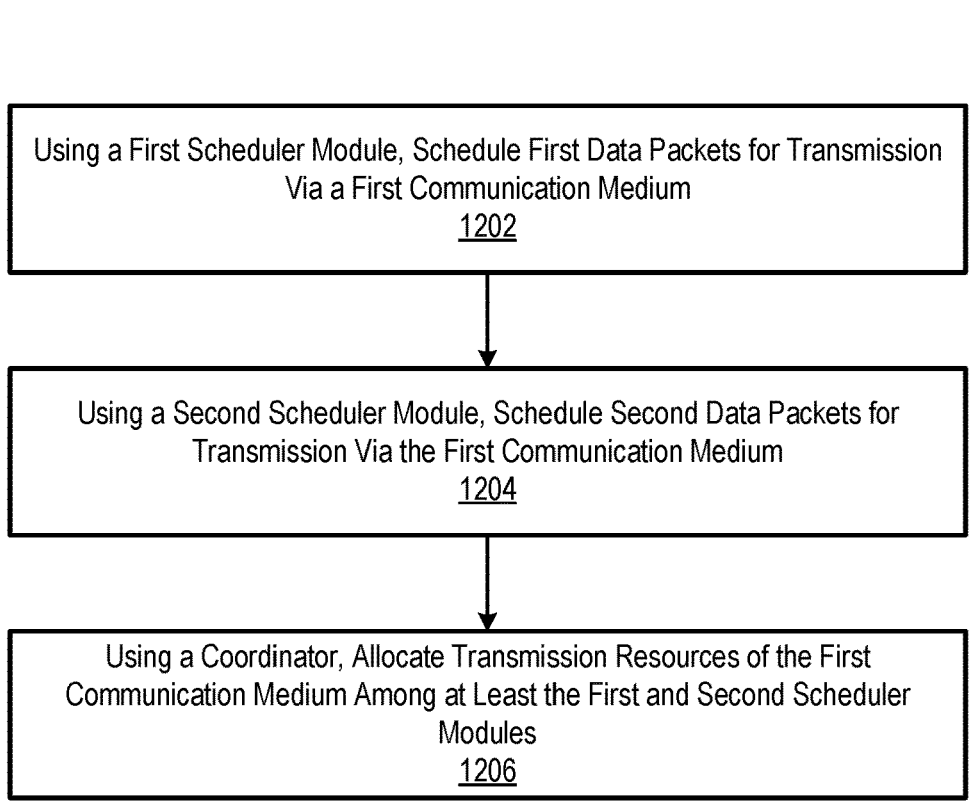
FIG. 12 is a flow chart of a method for scheduling data transmission in a communication network, according to an embodiment.

FIG. 12 is a flow chart of a method 1200 for scheduling data transmission in a communication network. In a block 1202 of method 1200, first data packets are scheduled for transmission via a first communication medium, using a first scheduler module. In one example of block 1202, scheduler module 216(1) schedules first data packets for transmission via communication medium 212. In a block 1204 of method 1200, second data packets are scheduled for transmission via the first communication medium, using a second scheduler module. In one example of block 1202, scheduler module 216(2) schedules second data packets for transmission via communication medium 212. In a block 1206 of method 1200, transmission resources of the first communication medium are allocated among at least the first and second scheduler modules using a coordinator. In one example of block 1206, coordinator 222 schedules resources of communication medium among scheduler modules 216(1), 216(2), and 216(3).

Figure 13:
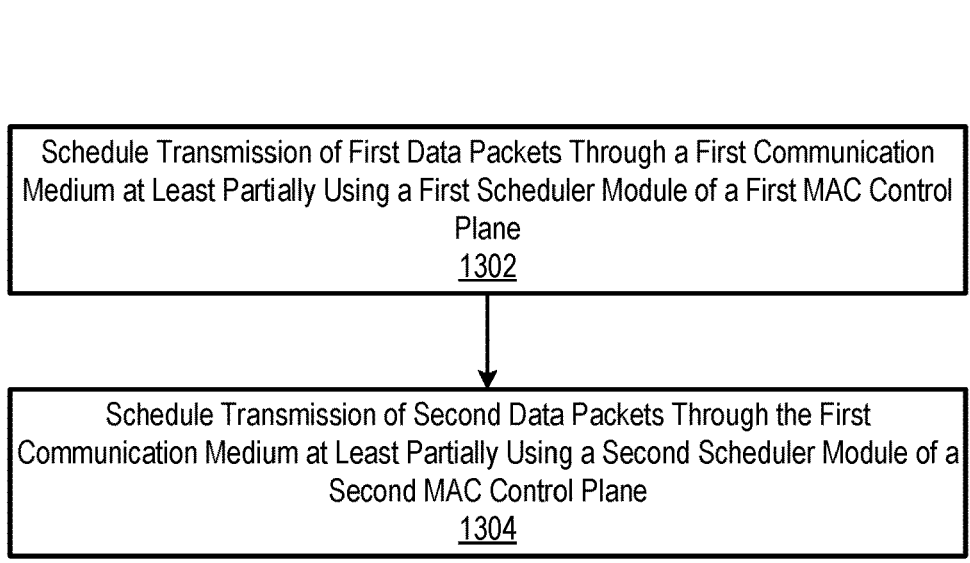
FIG. 13 is a flow chart of another method for scheduling data transmission in a communication network, according to an embodiment.

FIG. 13 is a flow chart of a method 1300 for controlling data transmission in a communication network. In a block 1302 of method 1300, transmission of first data packets through a first communication medium is scheduled at least partially using a first scheduling module of a first MAC control plane. In one example of block 1302, scheduler module 516(1) of MAC control plane 503(1) schedules transmission of first data packets through communication medium 212. In a block 1304 of method 1300, transmission of second data packets through the first communication medium is scheduled at least partially using a second scheduler module of second MAC control plane. In one example of block 1304, scheduler module 516(N) of MAC control plane 503(N) schedule transmission of second data packets through communication medium 212.

Pluggable MAC Layers

In a conventional communication network, hardware typically limits data transmission protocol implementation. Consequently, once a new communication protocol is deployed, communication network service offerings usually remain substantially unchanged until the next hardware upgrade. Additionally, communication network innovation may be constrained by the need to develop hardware for testing new transmission protocols and other innovations.

Disclosed herein are pluggable MAC layers and associated methods which at least partially overcome the above-discussed drawbacks. Certain embodiments of new MAC layers are "pluggable" or virtually configurable in that they may be modified by swapping out software modules, instead of requiring changes to hardware. Additionally, in particular embodiments, a MAC layer may be implemented by selecting one or more MAC modules from a software library of pluggable MAC modules, thereby enabling implementation of a variety of alternative MAC layers in a given piece of hardware.

In particular embodiments, the pluggable MAC layers define a standardized relationship between the MAC layer and a PHY layer, e.g., for packet-based protocols, as a software application programming interface (API) or other interface. A minimum common set of packet-based PHY functionalities may be implemented in hardware, while the majority of functionalities for a packet-based MAC sublayer may be implemented in software.

The pluggable MAC layers and associated methods may achieve significant advantages that cannot be realized by conventional MAC layers. For example, particular embodiments enable interchanging of communication technologies, e.g., leveraging features of a Wi-Fi, $3^{rd}$ Generation Partnership (3GPP), or satellite MAC sublayer with a DOCSIS, passive optical network (PON), or DSL PHY layer, or vice-versa. Additionally, some embodiments enable dynamically adaptable communication network service offerings, such as by swapping out one of more software components of a pluggable MAC layer. Furthermore, the ability to change MAC layer configuration enabled by the pluggable MAC layers promotes longevity and value of communication network hardware. Moreover, the new pluggable MAC layers may facilitate communication network innovation by enabling ease of MAC layer implementation and/or modifications. For example, a new MAC layer could be created without hardware changes by writing a new software component and/or by selecting one or more different software components from an existing software library.

While the new pluggable MAC layers are primarily discussed herein as being sublayers, such as a sublayer of a data link layer in an OSI layer stack, it is understood that the new pluggable MAC layers are not limited to being sublayers. For example, some embodiments of the new pluggable MAC layers could instead be a complete layer of a communication network layer stack.

Figure 15:
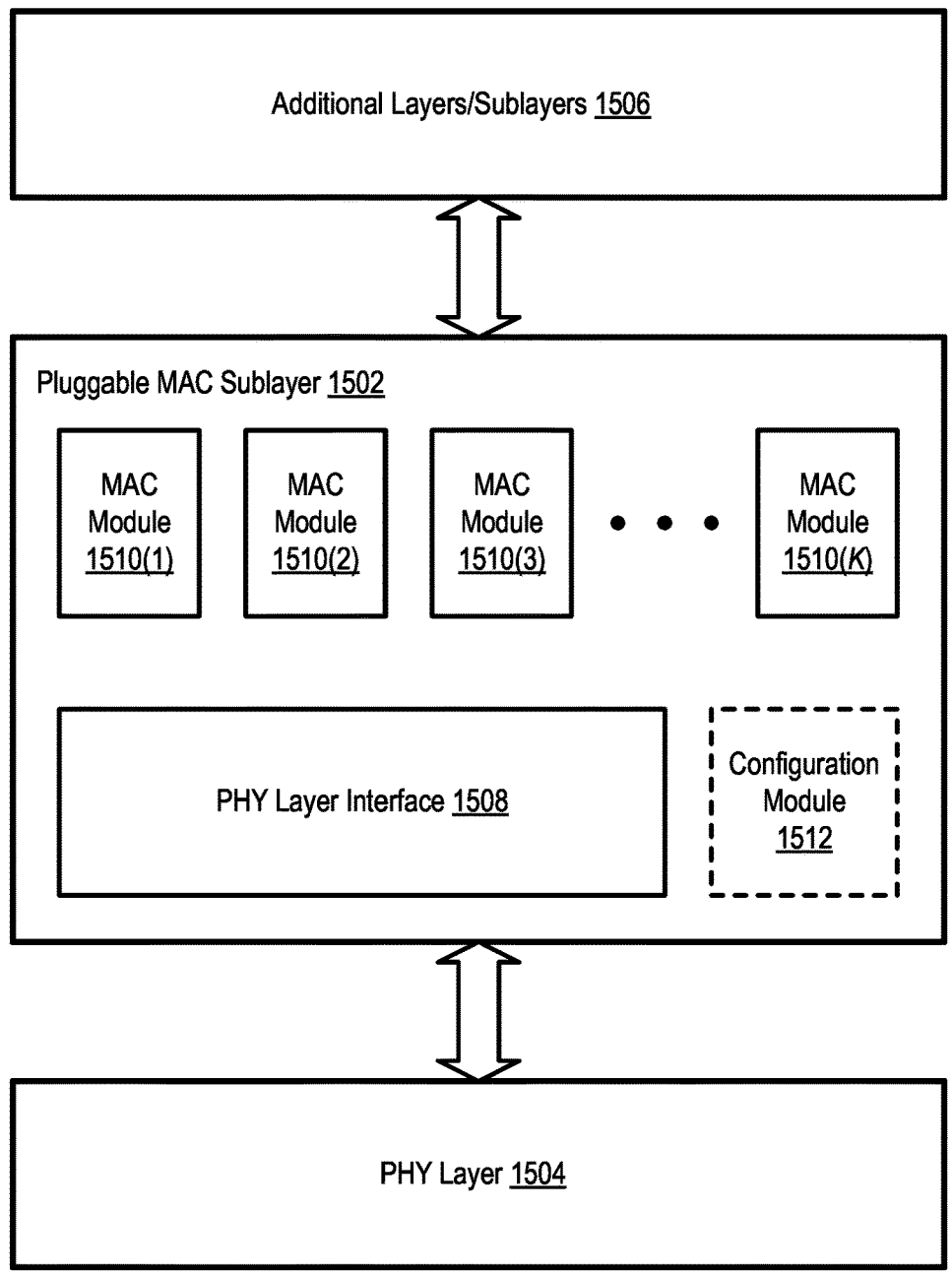
FIG. 15 is a block diagram of a communication environment including a pluggable MAC sublayer, according to an embodiment.

FIG. 15 is block diagram of a communication environment including a pluggable MAC sublayer 1502, a PHY layer 1504, and additional layers/sublayers 1506, where pluggable MAC sublayer 1502 is one embodiment of the new pluggable MAC layers disclosed herein. While FIG. 15 illustrates each of pluggable MAC sublayer 1502, PHY layer 1504, and additional layers/sublayers 1506 as being separate elements, two or more of these elements could be at least partially implemented by common hardware and/or by common software. PHY layer 1504 is configured, for example, to facilitate transfer of data symbols across a physical communication medium (e.g., an optical cable, an electrical cable, and/or free space), such as by defining interfaces with the communication medium, controlling bit rate, controlling synchronization, etc. Additionally layers/sublayers 1506 include additional communication network layers and/or sublayers, such as additional layers and/or sublayers of an OSI stack. For example, in some embodiments, additional layers/sublayers 1506 include one or more of the following: (a) a LLC sublayer, (b) a network layer, (c) a transport layer, (d) a session layer, (e) a presentation layer, and (f) an application layer.

Pluggable MAC sublayer 1502 includes a PHY layer interface 1508, K MAC modules 1510, and an optional configuration module 1512, where K is an integer greater than or equal to one. Pluggable MAC sublayer 1502 can (and typically will) include additional elements. For example, some embodiments of pluggable MAC sublayer 1502 further include one or more data pipelines (not shown) and/or intercomponent communications (not shown) for communicating between elements of pluggable MAC sublayer 1502.

PHY layer interface 1508 interfaces pluggable MAC sublayer 1502 with PHY layer 1504. For example, in certain embodiments, PHY layer interface 1508 is configured to (a) translate control signals and/or data signals received from MAC modules 1510 to a format that is compatible with PHY layer 1504 and (b) translate control signals and/or data signals received from PHY layer 1504 to a format that is compatible with MAC modules 1510. In particular embodiments, PHY layer interface 1508 adheres to a standard defining a relationship between a PHY layer and a MAC sublayer, to promote compatibility of pluggable MAC sublayer 1502 with a wide variety of communication networks. Additionally, some embodiments of PHY layer interface 1508 include an API.

MAC modules 1510 cooperate with PHY layer interface 1508 to implement functionality of pluggable MAC sublayer 1502. Possible functions provided by pluggable MAC sublayer 1502 include, but are not limited to, one or more of (a) encoding of transmission entities received from additional layers/sublayers 1506 into bits for PHY layer 1504, (b) decoding of bits received from PHY layer 1504 into transmission entities for additional layers/sublayers 1506, (c) supporting one or more data transmission protocols, (d) providing frame synchronization, and (e) providing flow control. Each MAC module 1510 at least partially implements one or more functions of pluggable MAC sublayer 1502, and functionality of pluggable MAC sublayer 1502 can be modified by adding, removing, and/or changing one or more MAC modules 1510. For instance, assume that pluggable MAC sublayer 1502 needs to support a new data transmission protocol. Certain embodiments of pluggable MAC sublayer 1502 can be modified to support this new data transmission protocol without requiring a hardware modification simply by adding one or more corresponding MAC modules 1510 to pluggable MAC sublayer 1502. In particular embodiments, MAC modules 1510 are implemented in software and pluggable MAC sublayer 1502 is accordingly virtually configurable. In these embodiments, MAC modules 1510 can therefore be added, removed, and/or changed by modifying software of pluggable MAC sublayer 1502 without requiring a change in hardware of pluggable MAC sublayer 1502. Furthermore, in certain embodiments, MAC modules 1510 for pluggable MAC sublayer 1502 may be selected from a library of pre-written software MAC modules, thereby promoting ease of implementation and/or modification of pluggable MAC sublayer 1502.

Optional configuration module 1512 facilitates adding MAC modules 1510 to pluggable MAC sublayer 1502, deleting MAC modules 1510 from pluggable MAC sublayer 1502, and/or modifying MAC modules 1510 in pluggable MAC sublayer 1502. For example, some embodiments of configuration module 1512 are configured to install and/or uninstall a MAC module 1510. As another example, certain embodiments of configuration module 1512 are configured to enable editing of one or more MAC modules 1510 of pluggable MAC sublayer 1502

Possible applications of pluggable MAC sublayer 1502 include, but are not limited to, wireline access communication networks (e.g., cable access communication networks, PON access communication networks, DSL access communication networks, and power line access communication networks, wireless access communication networks (e.g., cellular wireless access communication networks, fixed wireless access communication networks, Wi-Fi wireless access communication networks, and satellite wireless communication networks), transmission communication networks (e.g., wireline transmission communication networks and wireless transmission communication networks), and hybrid communication networks. It should be noted that the significant flexibility achieved by particular embodiments of pluggable MAC sublayer 1502, e.g., the ability to implement constituent MAC modules 1510 as desired without hardware changes, may be particularly conducive to supporting a converged communication network, i.e., a communication network supporting two or more different communication technologies. For example, particular embodiments of pluggable MAC sublayer 1502 could be configured to support two or more data transmission protocols, e.g., a wireline data transmission protocol and a wireless data transmission protocol, simply by incorporating the appropriate MAC modules 1510 for these two data transmission protocols in pluggable MAC sublayer 1502.

Figure 16:
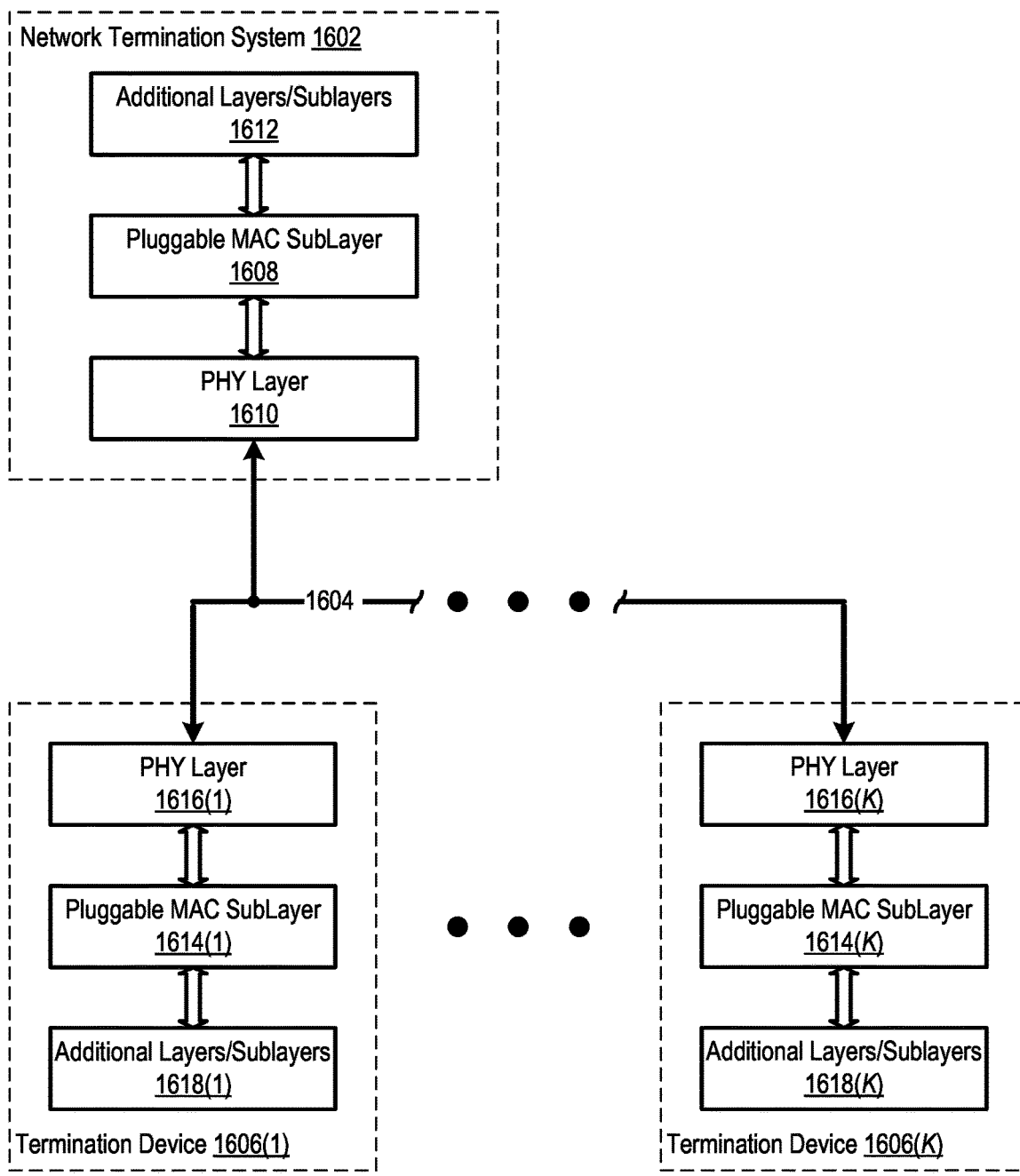
FIG. 16 is a block diagram of a communication network including a plurality of instances of the pluggable MAC sublayer of FIG. 15, according to an embodiment.

FIG. 16 is a block diagram of a communication network 1600 illustrating one possible application of pluggable MAC sublayer 1502. Communication network 1600 includes a network termination system 1602, a communication medium 1604, and K network termination devices 1606, where K is an integer greater than or equal to one. In some embodiments, network termination system 1602 is a modem termination system (e.g., a cable modem termination system or a wireless modem termination system), a DSLAM, an OLT, a cellular wireless communication core (e.g., an EPC, a 5G cellular wireless communication core, and/or a 6G cellular wireless communication core), a satellite wireless communication ground station, a cellular wireless communication core, and/or the like.

Communication medium 1604 communicatively couples network termination system 1602 with each termination device 1606. Communication medium 1604 may be a single communication medium, or communication medium 1604 may include two or more different communication mediums which need not be of the same type. Examples of communication medium 1604 include, but are not limited to, one or more of an optical cable, an electrical cable (e.g., a coaxial electrical cable, a telephone electrical cable, an Ethernet electrical cable, and/or a power line electrical cable), and free space (e.g., for transmission of optical wireless communication signals or radio frequency wireless communication signals). Communication medium 1604 may also include supporting elements such as amplifiers, splitters, repeaters, conversion devices (e.g., fiber nodes, remote terminals, and/or ONUs), etc., without departing from the scope hereof. While FIG. 16 depicts communication network 1600 as having a point-to-multi-point topology, communication network 1600 could be configured to have a different topology, including, but not limited to, a point-to-point topology, a mesh topology, a ring topology, etc.

In some embodiments, each termination device 1606 is a modem, and examples of possible modems include, but are not limited to, a cable modem, a DSL modem, and a wireless modem (e.g., for interfacing one or more clients with a Wi-Fi wireless communication link, a cellular wireless communication link, a satellite wireless communication link, a Bluetooth wireless communication link, and/or a LoRa wireless communication link). However, termination devices 1606 are not limited to being modems, and one or more of termination devices 1606 could instead by another type of termination device, including but not limited to, an ONU, an ONT, a fiber node, a remote terminal, a wireless base station, and/or a gateway. Termination devices 1606 could be free-standing devices, or termination devices 1606 could be incorporated in one or more additional devices (not shown). For example, in some embodiments, termination devices 1606 are integrated within respective computing devices, communication devices, network devices, entertainment devices, IoT devices, etc. Each termination device 1606 need not have the same configuration. For example, one termination device 1606 could be a modem or an ONT while another termination device 1606 could be a wireless base station.

Network termination system 1602 includes a pluggable MAC sublayer 1608, a PHY layer 1610, and additional layers/sublayers 1612, which are embodiments of pluggable MAC sublayer 1502, PHY layer 1504, and additional layers/sublayers 1506, respectively. Additionally, each termination device 1606 includes a pluggable MAC sublayer 1614, a PHY layer 1616, and additional layers/sublayers 1618, which are embodiments of pluggable MAC sublayer 1502, PHY layer 1504, and additional layers/sublayers 1506, respectively. Details of pluggable MAC sublayers 1608 and 1614 are not shown in FIG. 16 for illustrative clarity. In some embodiments, each of pluggable MAC sublayers 1608 and 1614 includes a respective instance of PHY layer interface 1508 (not shown in FIG. 16) that adheres to a common standard, while the configuration and quantity of MAC modules 1510 (not shown in FIG. 16) varies among pluggable MAC sublayers 1608 and 1614 according to their particular requirements.

Figure 17:
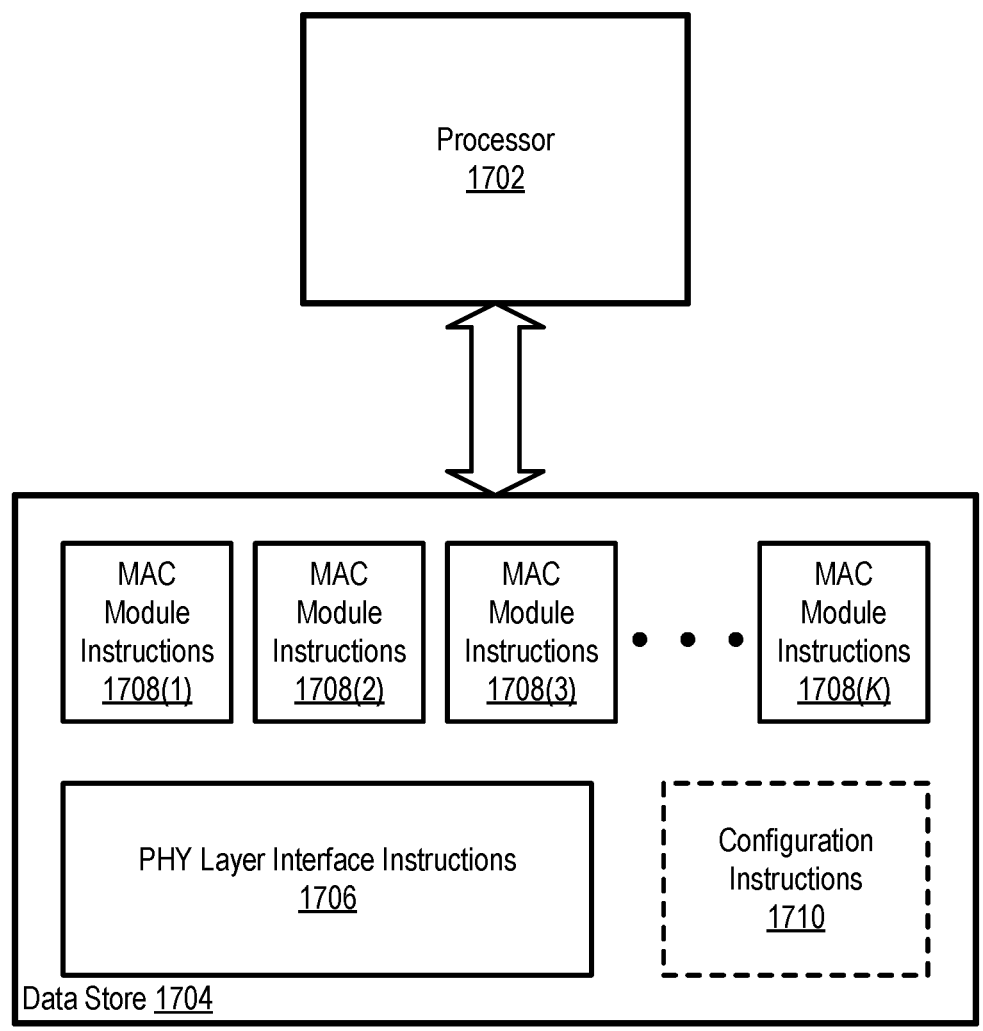
FIG. 17 is a block diagram of one possible embodiment of the pluggable MAC sublayer of FIG. 15.

Referring again to FIG. 15, certain embodiments of pluggable MAC sublayer 1502 are implemented by digital electronics and/or analog electronics. For example, in particular embodiments, the elements of pluggable MAC sublayer 1502 are at least partially implemented by purpose-built physical devices, such as application-specific integrated circuits (ASICs). As another example, in certain embodiments, the elements of pluggable MAC sublayer 1502 are software based, virtualized, and/or cloud native. For instance, some embodiments of pluggable MAC sublayer 1502 are at least partially implemented by one or more processors executing instructions, such as in the form of firmware and/or software, stored in one or more memories, to perform the functions of pluggable MAC sublayer 1502. For example, FIG. 17 is a block diagram of a pluggable MAC sublayer 1700, which is one possible embodiment of pluggable MAC sublayer 1502 where pluggable MAC sublayer 1502 is at least partially embodied by a processor executing instructions stored in memory. Pluggable MAC sublayer 1700 includes a processor 1702 communicatively coupled to a data store 1704. Although processor 1702 and data store 1704 are illustrated as being single elements, each of processor 1702 and data store 1704 could be implemented by multiple sub-elements that need not by implemented by common hardware or even implemented at a common location. For example, each of processor 1702 and data store 1704 could be implemented in a distributed computing system, such as in a cloud computing system.

Data store 1704 includes PHY layer interface instructions 1706 and respective MAC module instructions 1708 for each MAC module 1510 of FIG. 15. Each of instructions 1706 and instructions 1708 includes, for example, software. Processor 1702 is configured to execute PHY layer interface instructions 1706 to perform the functions of PHY layer interface 1508. In some alternate embodiments, however, PHY layer interface 1508 is embodied by a combination of (a) processor 1702 executing PHY layer interface instructions 1706 and (b) hardware (not shown). Processor 1702 is additionally configured to execute each of MAC module instructions 1708 to the perform the functions of a respective MAC module 1510. In particular, processor 1702 is configured to execute MAC module instructions 1708(1) to implement the functions of MAC module 1510(1), processor 1702 is configured to execute MAC module instructions 1708(2) to implement the functions of MAC module 1510(2), and so on. Data store 1704 optionally further includes configuration instructions 1710, which processor 1702 executes to perform the functions of configuration module 1512.

Data store 1704 could include additional instructions. For example, in some alternate embodiments, data store 1704 further includes instructions for partially or completely implementing PHY layer 1504 and/or one or more of additional layers/sublayers 1506. Additionally, pluggable MAC sublayer 1700 could be partially or completely combined with one or more other elements, such as a network termination system, a network termination device, a network router, a network switch, a network hub, or the like.

Figure 18:
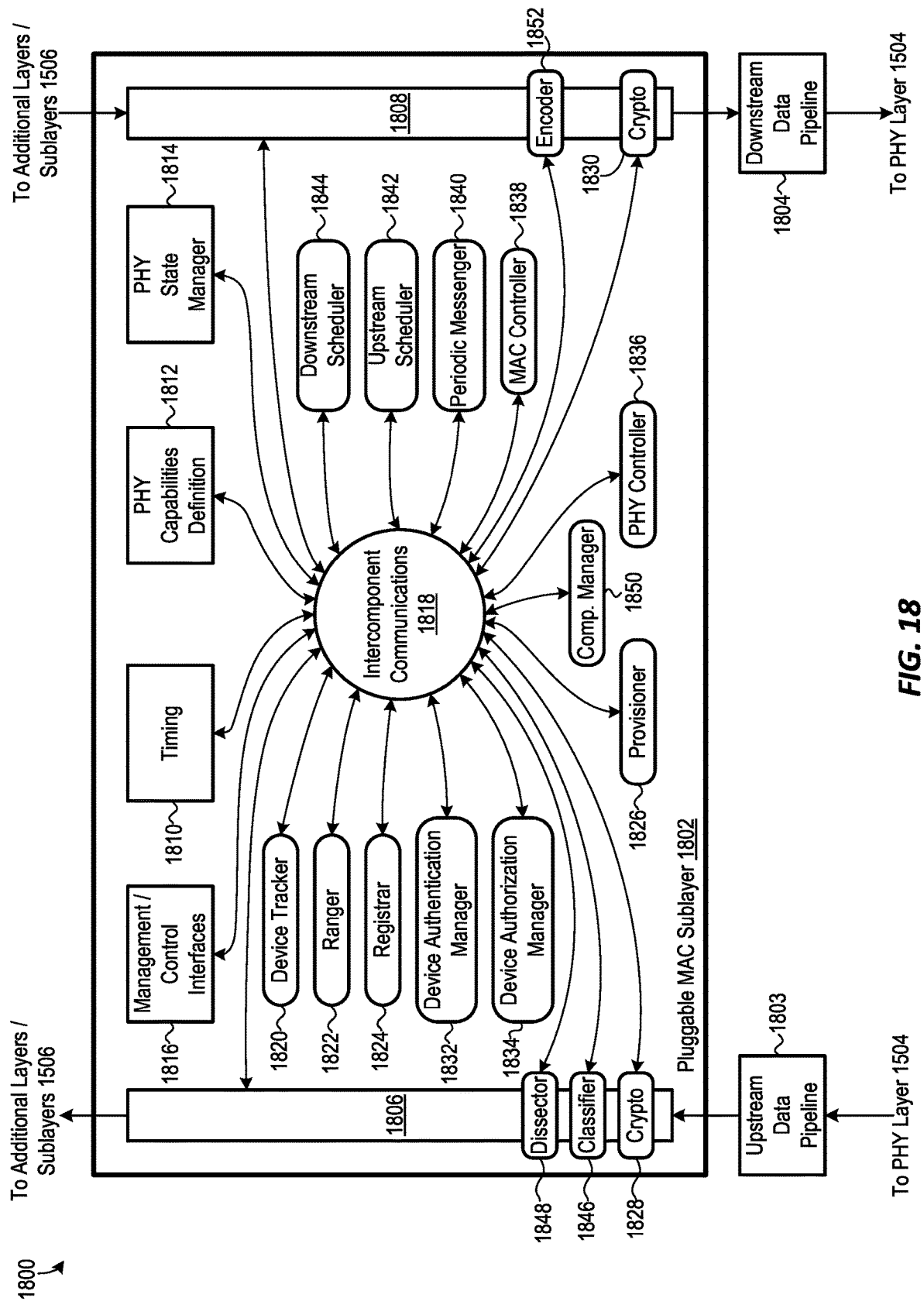
FIG. 18 is a block diagram of a communication environment including another embodiment of the pluggable MAC sublayer of FIG. 15.

FIG. 18 is a block diagram of a communication environment 1800 including a pluggable MAC sublayer 1802, an external upstream data pipeline 1803, and an external downstream data pipeline 1804, where pluggable MAC sublayer 1802 is another embodiment of pluggable MAC sublayer 1502 of FIG. 15. External upstream data pipeline 1803, which is logically coupled between pluggable MAC sublayer 1802 and PHY layer 1504 (not shown in FIG. 15) is configured to manage buffering, reading, and writing of upstream data between PHY layer 1504 and pluggable MAC sublayer 1802. Similar, external downstream data pipeline 1804, which is logically coupled between pluggable MAC sublayer 1802 and PHY layer 1504, is configured to manage buffering, reading, and writing of downstream data between PHY layer 1504 and pluggable MAC sublayer 1802.

Pluggable MAC sublayer 1802 includes the following core components and interfaces, which collectively form one possible embodiment of PHY layer interface 1508 of FIG. 15: (1) an internal upstream data pipeline 1806, (2) an internal downstream data pipeline 1808, (3) a timing module 1810, (4) a PHY capabilities definition module 1812, (5) a PHY state manager module 1814, and (6) management control interfaces 1816. Internal upstream data pipeline 1806 is configured to manage live upstream frames and live upstream user data. Some embodiments of internal upstream data pipeline 1806 are configured to support one or more of QoS, security, and metric reporting. Similarly, internal downstream data pipeline 1808 is configured to manage live downstream frames and live downstream user data. Some embodiments of internal downstream data pipeline 1808 are also configured to support one or more of QoS, security, and metric reporting. Timing module 1810 is configured as a system clock and/or as a reference clock. Some embodiments of timing module 1810 receive timing information from an external source, e.g., from an external precision timing protocol (PTP) source. Some other embodiments of timing module 1810 are configured to provide timing information as an offset based on a number of frames, such as in a manner analogous to using minislot numbers as a timing source.

PHY capabilities definition module 1812 is configured as an interface to PHY layer 1504. Some embodiment of PHY capabilities definition module 1812 are configured to perform one or more of the following functions: sending downstream frames, receiving upstream frames, defining maximum frame rate, defining minimum frame rate, defining envelope format for frames, defining supported frequencies/wavelengths, and defining supported physical ports. PHY state manager module 1814 is configured to control the status and configuration of PHY layer 1504. For example, some embodiments of PHY state manager module 1814 are configured to turn on/off PHY layer 1504 and/or to adjust one or more tunable components in PHY layer 1504. Management control interfaces 1816 are configured to manage components of pluggable MAC sublayer 1802, including components that are running.

Pluggable MAC sublayer 1802 further includes the following MAC modules, each of which is an embodiment of a MAC module 1510 instance of FIG. 15: (1) an intercomponent communications module 1818, (2) a device tracker module 1820, (3) a ranger module 1822, (4) a registrar module 1824, (5) a provisioner module 1826, (6) an upstream cryptography module 1828, (7) a downstream cryptography module 1830, (8) a device authentication manager module 1832, (9) a device authorization manager module 1834, (10) a PHY controller module 1836, (11) a MAC controller module 1838, (12) a periodic messenger module 1840, (13) an upstream scheduler module 1842, (14) a downstream scheduler module 1844, (15) an upstream MAC frame classifier module 1846, (16) an upstream MAC frame dissector module 1848, (17) a component manager module 1850, and (18) a MAC frame encoder 1852. Intercomponent communications module 1818 is configured to enable elements of pluggable MAC sublayer 1802 to communicate with each other. In some embodiments, intercomponent communications module 1818 includes one or more of a bus, shared memory, and method/function calls. Intercomponent communications module 1818 supports, for example, communication of frame data, management data, and/or frame metadata. Certain embodiments of intercomponent communications module 1818 include a single component for managing communication among elements of pluggable MAC sublayer 1802, such as a bus, a queue, or a shared database. Alternately or additionally, pluggable MAC sublayer 1802 could be configured so that components of pluggable MAC sublayer 1802 can also communicate directly without an additional communication bus. In some embodiments, intercomponent communications module 1818 supports any combination of shared and direct communication between components of pluggable MAC sublayer 1802.

Device tracker module 1820 is configured to track a MAC state of one or more end user devices in a MAC domain of pluggable MAC sublayer 1802. Examples of such end user devices include, but are not limited to, customer premises equipment (CPE), user equipment (UE), a modem (e.g., a cable modem, a DSL modem, or a wireless modem), an ONU, and an ONT. Ranger module 1822 is configured to perform a ranging process, such as synchronizing of a radio on an end user device with a master clock. Registrar module 1824 is configured to authenticate an end user device, optionally in conjunction with an external authentication system. Certain embodiments of registrar module 1824 are configured to populate an end user device tracker, e.g., a modem tracker, with capabilities of end user devices. Additionally, some embodiments of registrar module 1824 are configured to assign an unique identifier, e.g., a security identifier (SID), to each end user device, such as after an initialization process occurs. Furthermore, particular embodiments of registrar module 1824 are configured to confirm end user device configuration.

Provisioner module 1826 is configured to bring end user devices online. Some embodiments of provisioner module 1826 are configured to use OSI layer 2 management messages when performing provisioning. Additionally, particular embodiments of provisioner module 1826 are configured to cooperate with external systems, such as an external dynamic host configuration protocol (DHCP) server and/or a trivial file transfer protocol (TFTP) server, when performing provisioning. Upstream cryptography module 1828 is configured to perform encryption and decryption of upstream data frames, and downstream cryptography module 1830 is configured to perform encryption and decryption of downstream data frames. Device authentication manager module 1832 is configured to support end user device authentication using, for example, a certificate, a subscriber identifier module (SIM), a user identifier and password, and/or a token, to ensure user device identity and/or to provide proof of such identity to pluggable MAC sublayer 1802.

Device authorization manager module 1834 is configured to determine whether a given end user device is entitled to user services, as well as to determine which user services the given end user device is entitled to use. PHY controller module 1836 is configured to perform runtime management of PHY layer 1504, such as to monitor and/or to adjust PHY layer 1504 as needed. MAC controller module 1838 is configured to respond to management messages, as well as to generate management messages. Certain embodiments of MAC controller module 1838 are configured to start before initialization of elements of pluggable MAC sublayer 1802. Periodic messenger module 1840 is configured to generate periodic downstream messages and send them to internal downstream data pipeline 1808. Upstream scheduler module 1842 is configured to manage upstream bandwidth, such as through one or more of reservations, bandwidth requests, QoS, policy, artificial intelligence/machine learning, etc. Downstream scheduler module 1844 is configured to manage QoS and/or policy for downstream data traffic. In some embodiments, upstream scheduler module 1842 and/or downstream scheduler module 1844 are at least partially embodied by one or more of the modular schedulers discussed above. MAC frame classifier module 1846 is configured to classify upstream data frames, and MAC frame dissector module 1848 is configured to dissect upstream data frames. Component manager module 1850 is configured to manage one or more of the modules of pluggable MAC sublayer 1802, and MAC frame encoder 1852 is configured to encode MAC frames.

Discussed below with respect to FIGS. 19-28 are several examples of operation of pluggable MAC sublayer 1802. However, it is understood that pluggable MAC sublayer 1802 is not limited to operating according to the examples of FIGS. 19-28. Additionally, the examples of FIGS. 19-28 are applicable to pluggable MAC sublayers other than pluggable MAC sublayer 1802.

Figure 19:
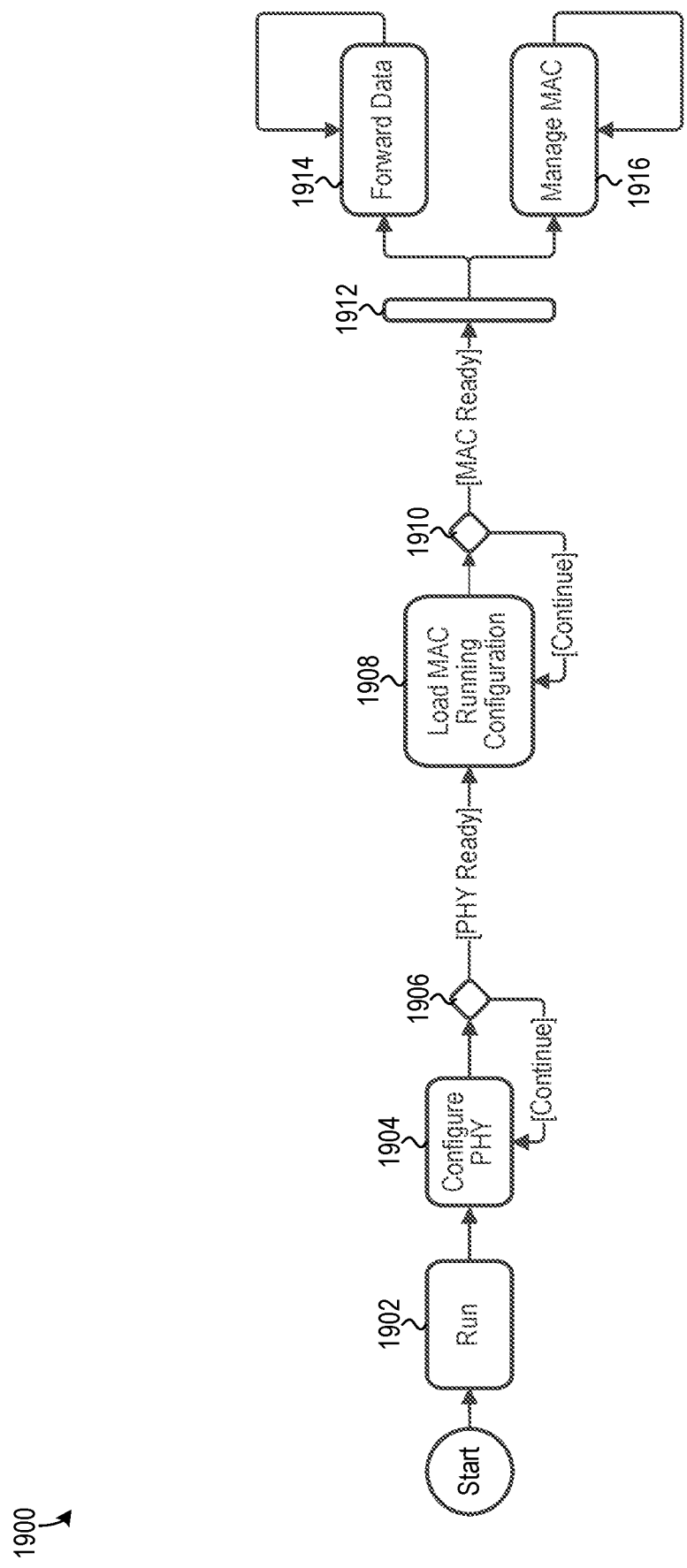
FIG. 19 is a flow chart of a method for end-to-end operation of one embodiment of the FIG. 18 pluggable MAC sublayer.

FIG. 19 is a flowchart of a method 1900 for end-to-end operation of one embodiment of pluggable MAC sublayer 1802. In a block 1902 of method 1900, pluggable MAC sublayer 1802 starts and runs. In a block 1904 of method 1900, pluggable MAC sublayer 1802 configures PHY layer 1504. In a decision block 1906 of method 1900, pluggable MAC sublayer 1802 determines whether configuration of PHY layer 1504 is complete. If the result of decision block 1906 is yes, PHY layer 1504 is ready, and method 1900 proceeds to a block 1908. If the result of decision block 1906 is no, method 1900 returns to block 1904 to continue configuring PHY layer 1504. In block 1908, pluggable MAC sublayer 1802 loads its running configuration. In a decision block 1910 of method 1900, pluggable MAC sublayer 1802 determines whether it is ready for operation. If the result of decision block 1910 is yes, method 1900 proceeds to a block 1912, and if the result of decision block 1910 is no, method 1900 returns to block 1908 to continue loading the running configuration.

In a block 1912 of method 1900, the method proceeds to blocks 1914 and 1916 in parallel. In block 1914, pluggable MAC sublayer 1802 processes and forwards upstream and downstream user data, e.g., using, at least in part, internal upstream data pipeline 1806 and internal downstream data pipeline 1808. In block 1916, pluggable MAC sublayer 1802 is managed, for instance, by sending management messages to PHY layer 1504 and/or by receiving management messages from PHY layer 1504.

Figure 20:
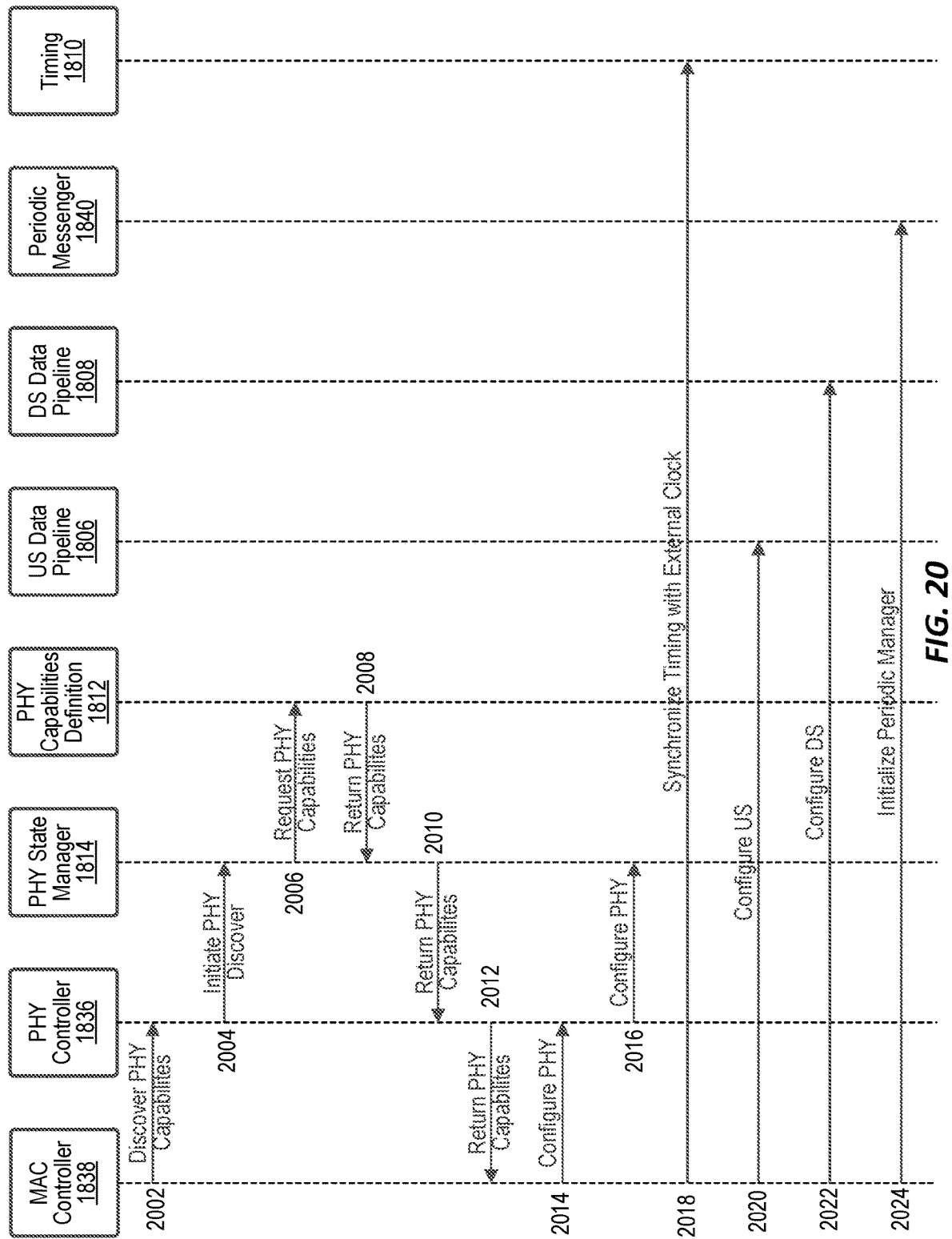
FIG. 20 is a dataflow diagram illustrating one example of initialization of an embodiment of the FIG. 18 pluggable MAC sublayer.

FIG. 20 is a dataflow diagram illustrating one example of initialization of an embodiment of pluggable MAC sublayer 1802. FIG. 20 includes vertical dashed lines logically representing each of MAC controller module 1838, PHY controller module 1836, PHY state manager module 1814, PHY capabilities definition module 1812, internal upstream data pipeline 1806, internal downstream data pipeline 1808, periodic messenger module 1840, and timing module 1810.

At a time 2002, MAC controller module 1838 module initiates discovery of PHY layer 1504 capabilities by initiating a call to PHY controller module 1836. Examples of PHY layer 1504 capabilities include, but are not limited to, frequency range, channel width, etc. At a time 2004, PHY controller module 1836 initiates PHY discovery by sending a query to PHY state manager module 1814. At a time 2006, PHY state manager module 1814 queries PHY capabilities definition module 1812 to obtain PHY layer 1504 capabilities. Certain embodiments of PHY capabilities definition module 1812 obtain PHY layer 1504 capabilities, for example, from a data store (e.g., a read only memory or a random access memory), from a configuration file, or by lookup based on a model number, or other identifier, associated with PHY layer 1504. PHY layer capabilities definition module 1812 returns PHY layer 1504 capabilities to PHY state manager module 1814 at a time 2008, and PHY state manager module 1814 returns PHY layer 1504 capabilities to PHY controller module 1836 at a time 2010. PHY controller 1836, in turn, returns PHY layer 1504 capabilities to MAC controller module 1838 at a time 2012.

At a time 2014, MAC controller module 1838 send a PHY configuration message to PHY controller 1836, and PHY controller module 1836 sends the PHY configuration message to PHY state manager module 1814 at a time 2016, for creating a PHY layer definition. The PHY layer definition is based, for example, on the PHY layer 1504 capabilities discovered by MAC controller module 1838 and/or on external inputs. The PHY layer definition should be compatible with PHY layer 1504. At a time 2018, MAC controller module 1838 synchronizes timing with an external source, such as an external clock, via timing module 1810. Although FIG. 20 illustrates timing synchronization occurring at time 2018 after PHY layer 1504 capability discovery and after PHY layer 1504 configuration, timing synchronization could alternately occur before PHY layer 1504 capability discovery and/or before PHY layer 1504 configuration. At a time 2020, MAC controller module 1838 configures internal upstream data pipeline 1806, and at a time 2022, MAC controller module 1838 configures internal downstream data pipeline 1808. MAC controller module 1838 initializes periodic messenger module 1840 at a time 2024 by notifying periodic messenger module 1840 of PHY layer 1504, and in response thereto, periodic messenger module 1840 begins sending periodic messages.

Figure 21:
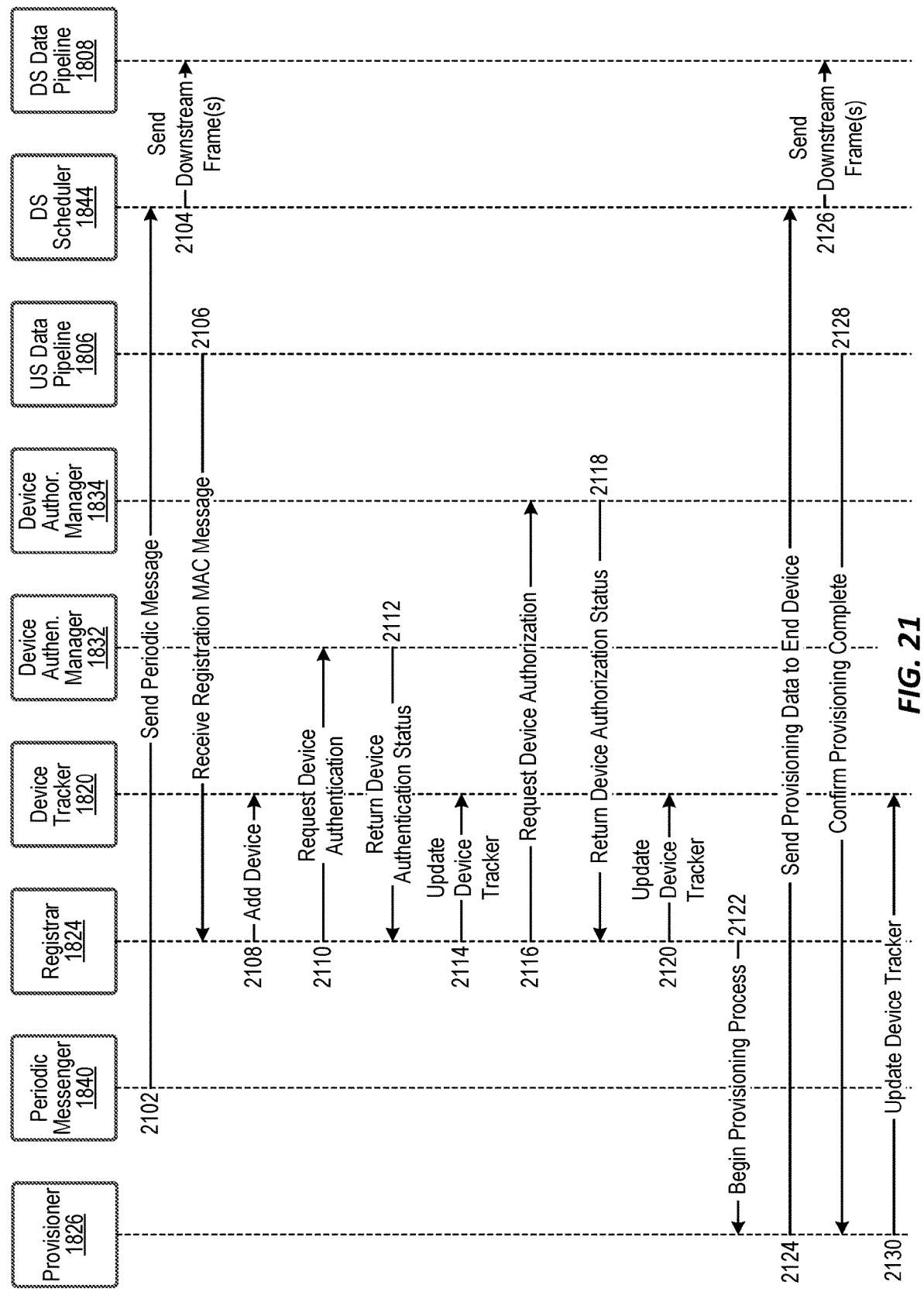
FIG. 21 is a dataflow diagram illustrating one example of device registration in an embodiment of the FIG. 18 pluggable MAC sublayer.

FIG. 21 is a dataflow diagram illustrating one example of device registration in an embodiment of pluggable MAC sublayer 1802. FIG. 21 includes vertical dashed lines logically representing each of provisioner module 1826, periodic messenger module 1840, registrar module 1824, device tracker module 1820, device authentication manager module 1832, device authorization manager module 1834, internal upstream data pipeline 1806, downstream scheduler module 1844, and internal downstream data pipeline 1808.

At a time 2102, periodic messenger module 1840 sends periodic messages with window and upstream channel information for device registration to downstream scheduler module 1844. In some embodiments, the periodic messages are broadcast messages including information on when and how to send a registration request. At a time 2104, the periodic messages are encoded, and downstream scheduler module 1844 sends one or more downstream frames to internal downstream data pipeline 1808 including the encoded periodic messages. At a time 2106, registrar module 1824 receives a registration MAC message from a device via internal upstream data pipeline 1806. During a registration window, devices can send registration requests, which are received by internal upstream data pipeline 1806, decoded, and classified.

At a time 2108, registrar module 1824 adds a device to device tracker module 1820. At a time 2110, registrar module 1824 requests device authentication from device authentication manager module 1832. If authentication is enabled, the identity of the device and/or use is verified. This process may require multiple messages between registrar module 1824 and the device. At a time 2112, device authentication manager module 1832 returns status of the device authentication to registrar module 1824. At a time 2114, registrar module 1824 updates device tracker module 1820 with status of the device authentication. Once the identify has been verified, the device may need to be authorized to run on the network. Accordingly, at a time 2116, registrar module 1824 send a device authorization request to device authorization manager module 1834. At a time 2118, device authorization manager module 1834 return results of device authorization status to registrar module 1824. At a time 2120, registrar module 1824 updates device tracker module 1820 with the results of the device authorization request.

At a time 2122, registrar module 1824 cooperates with provisioner module 1826 to begin provisioning of the device, and the device is then provisioned on a network associated with pluggable MAC sublayer 1802. Examples of possible provisioning of the device include, but are not limited to, channel configuration, throughput limits, security configurations, firmware updates, and other items. The provisioning process can be performed before device authentication and may be repeated on a periodic basis to reflect changes in the system or external requests. At a time 2124, provisioner module 1826 sends provisioning data to the device via downstream scheduler module 1844, e.g., via MAC messages or Internet Protocol (IP) based messages leveraging a standard such as a TR-369 standard. In embodiments supporting IP based management, such management is optionally hosted outside of pluggable MAC sublayer 1802 with traffic following a default data flow. At a time 2126, downstream scheduler module 1844 encodes one or more downstream frames and sends them to the device via internal downstream data pipeline 1808. At a time 2128, the device sends a message to provisioner module 1826 via internal upstream data pipeline 1806 confirming that provisioning is complete, or in the alternative, advising that an error has occurred. At a time 2130, provisioner module 1826 updates device tracker module 1820 with the results of the provisioning process.

Figure 22:
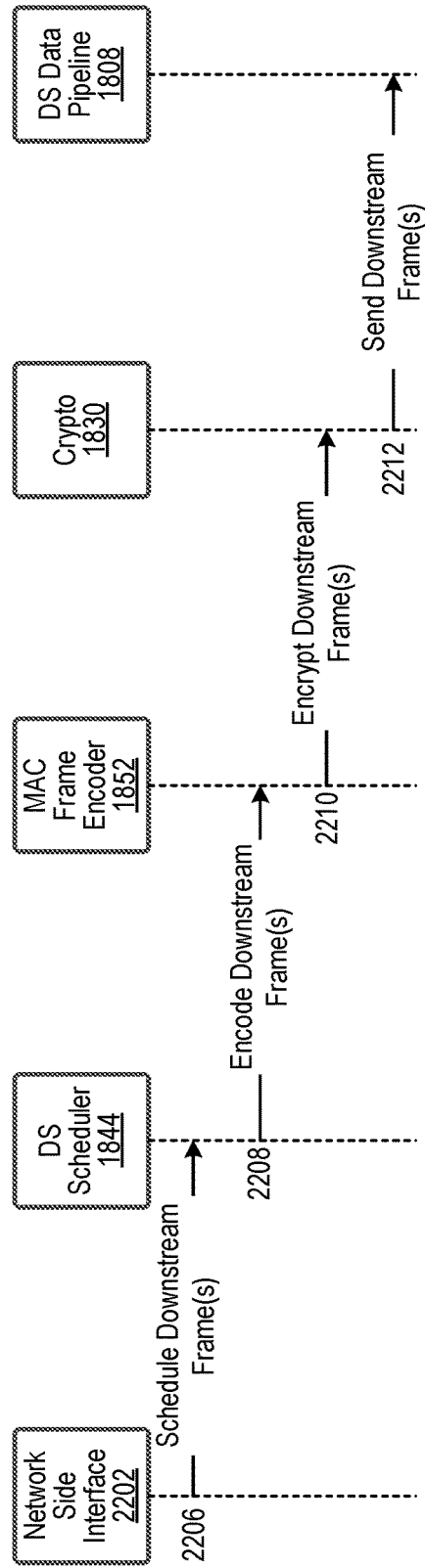
FIG. 22 is a dataflow diagram illustrating one example of receiving and forwarding downstream data in an embodiment of the FIG. 18 pluggable MAC sublayer.

FIG. 22 is a dataflow diagram illustrating one example of receiving and forwarding downstream data in an embodiment of pluggable MAC sublayer 1802. FIG. 22 includes vertical dashed lines logically representing each of a network side interface 1506, downstream scheduler module 1844, a MAC frame encoder 1852, downstream cryptography module 1830, and internal downstream data pipeline 1808. At a time 2206, network side interface 1506 requests that downstream scheduler module 1844 schedule downstream frames for sending, and downstream scheduler module 1844 accordingly schedules the downstream frames for sending. Scheduling can follow a variety of algorithms, including, but not limited to, a first-in-first-out (FIFO) algorithm or a policy based algorithm. At a time 2208, MAC frame encoder 1852 encodes traffic into a MAC frame, and at time 2210, downstream cryptography module 1830 encrypts the MAC frame. At a time 2212, the encrypted frame is sent to internal downstream data pipeline 1808, and PHY layer 1504 subsequently transmits the encrypted frame.

Figure 23:
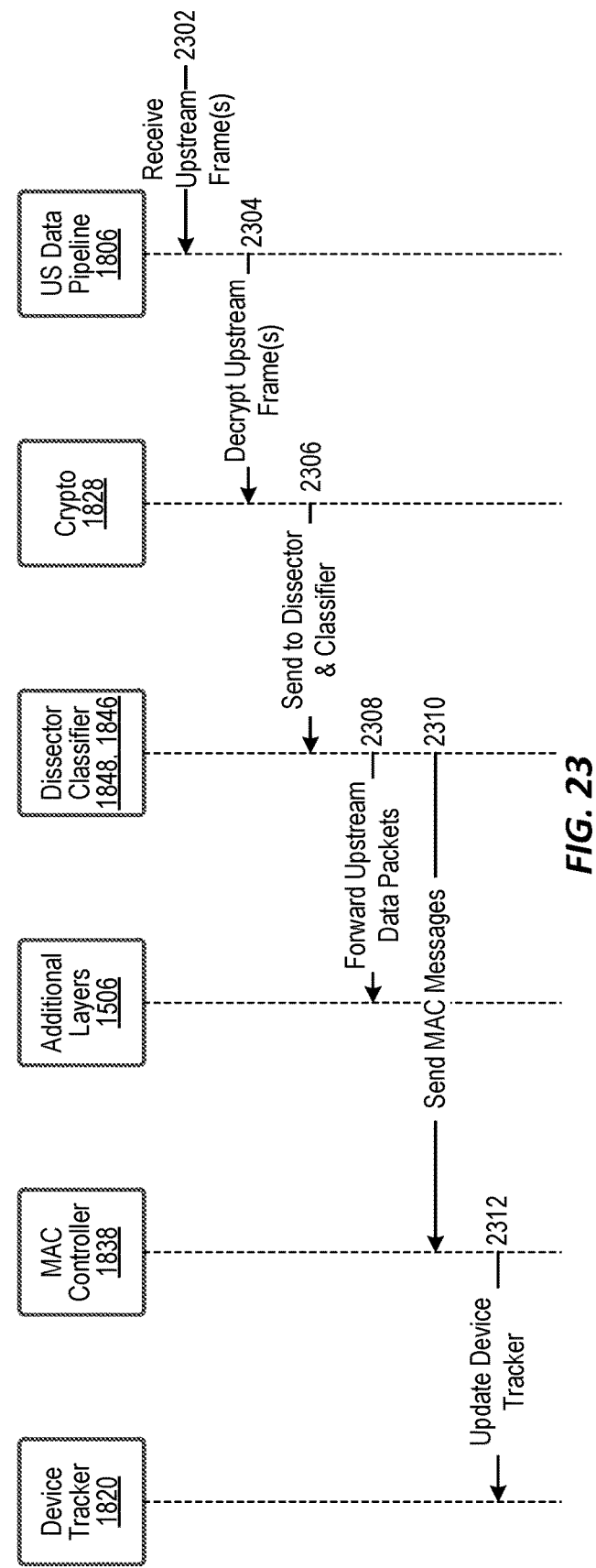
FIG. 23 is a dataflow diagram illustrating one example of receiving and forwarding upstream data in an embodiment of the FIG. 18 pluggable MAC sublayer.

FIG. 23 is a dataflow diagram illustrating one example of receiving and forwarding upstream data in an embodiment of pluggable MAC sublayer 1802. FIG. 23 includes vertical dashed lines logically representing each of device tracker module 1820, MAC controller module 1838, additional layers/sublayers 1506, dissector module 1848 and classifier module 1846, upstream cryptography module 1828, and internal upstream data pipeline 1806. At a time 2302, internal upstream data pipeline 1806 receives a frame from PHY layer 1504. At time 2304, upstream cryptography module 1828 decrypts the frame. At a time 2306, the frame is sent to dissector module 1848 and classifier module 1846. Dissector module 1848 dissects the frame and decodes it into one or more messages. Alternately, multiple frames can be combined into one message. Classifier module 1846 classifies the frame. Data packets of the frame are then forwarded based on their classification at a time 2308. At a time 2310 (which may be the same as time 2308), MAC management messages are sent to MAC controller module 1838, or to one or more other modules, based on their classification. At a time 2312, MAC controller module 1838 updates device tracker module 1820, as needed, based on the information in the MAC management messages.

Figure 24:
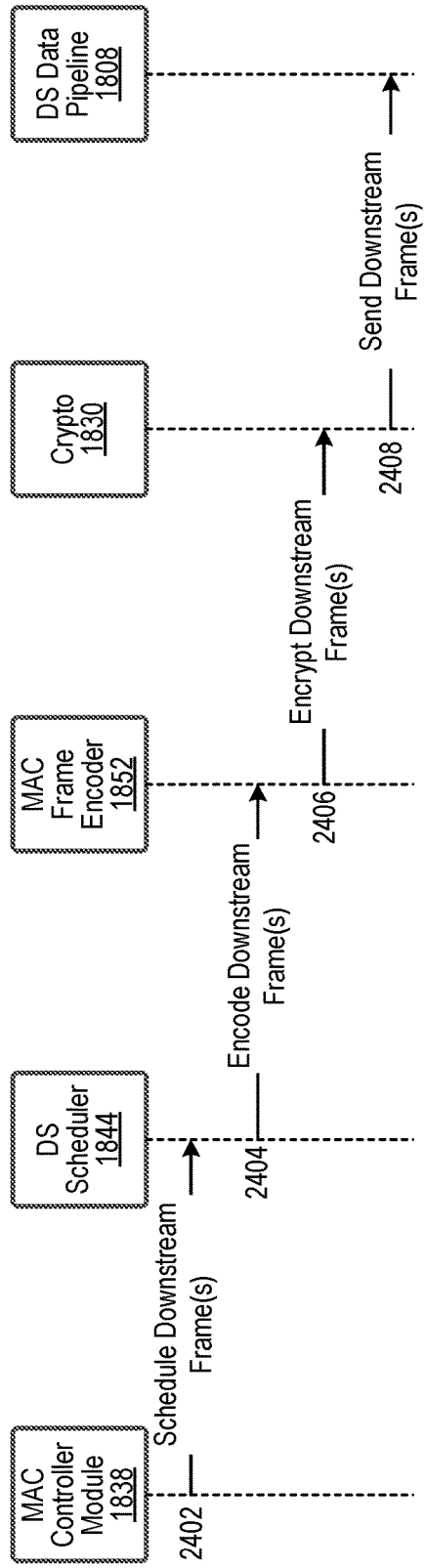
FIG. 24 is a dataflow diagram illustrating one example of sending a management message in an embodiment of the FIG. 18 pluggable MAC sublayer.

FIG. 24 is a dataflow diagram illustrating one example of sending a management message in an embodiment of pluggable MAC sublayer 1802. FIG. 24 includes vertical dashed lines logically representing each of MAC controller module 1838, downstream scheduler module 1844, MAC frame encoder 1852, downstream cryptography module 1830, and internal downstream data pipeline 1808. At a time 2402, MAC controller module 1838 requests that downstream scheduler module 1844 schedule downstream frames for sending, and downstream scheduler module 1844 accordingly schedules the downstream frames for sending. The downstream frames include a management message, and a source of the management message includes, for example, MAC controller module 1838, upstream scheduler module 1842, periodic messenger module 1840, or another module of pluggable MAC sublayer 1802. At a time 2404, MAC frame encoder 1852 encodes the message into a MAC frame, and at time 2406, downstream cryptography module 1830 encrypts the MAC frame. At a time 2408, the encrypted frame is sent to internal downstream data pipeline 1808, and PHY layer 1504 subsequently transmits the encrypted frame.

Figure 25:
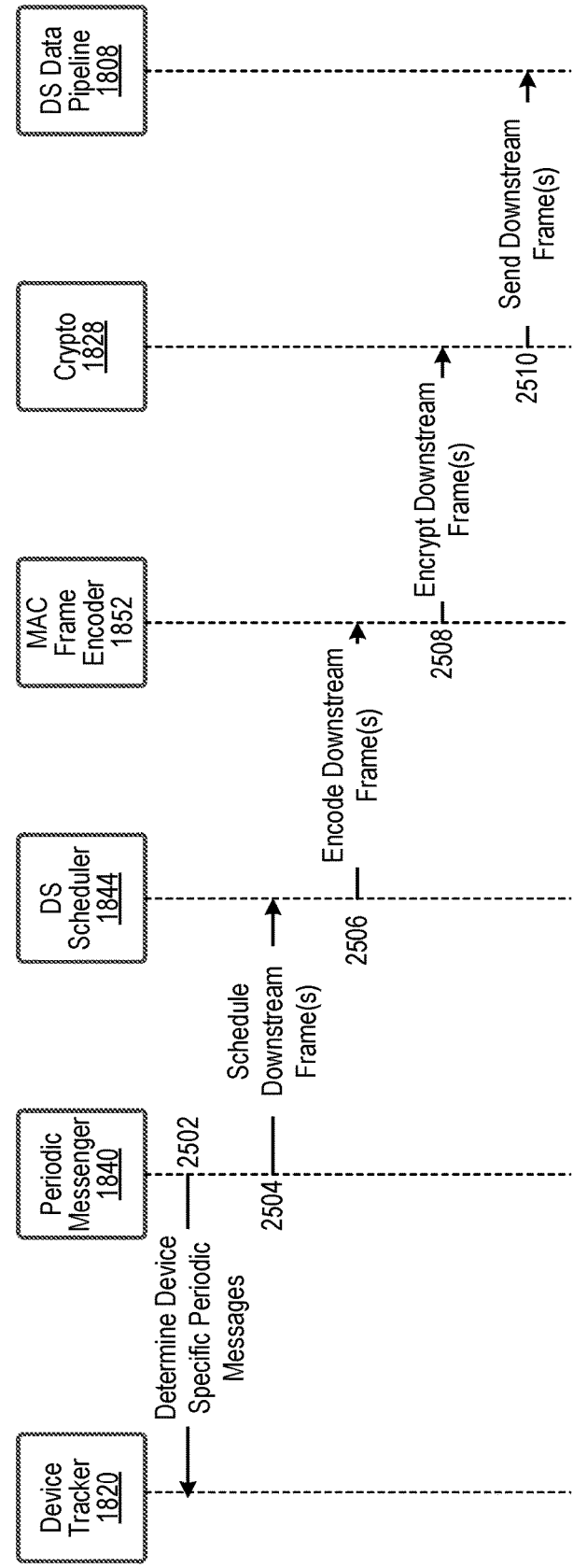
FIG. 25 is a dataflow diagram illustrating one example of sending periodic management messages in an embodiment of the FIG. 18 pluggable MAC sublayer.

FIG. 25 is a dataflow diagram illustrating one example of sending periodic management messages in an embodiment of pluggable MAC sublayer 1802. FIG. 25 includes vertical dashed lines logically representing each of device tracker module 1820, periodic messenger module 1840, downstream scheduler module 1844, MAC frame encoder 1852, downstream cryptography module 1830, and internal downstream data pipeline 1808. At a time 2502, periodic messenger module 1840 cooperates with device tracker module 1820 to determine device specific periodic messages. Periodic messenger module 1840 sends messages for device registration and other information that needs to be sent in a periodic basis, such as based on timers and/or other events. At a time 2504, periodic messenger module 1840 requests that downstream scheduler module 1844 schedule downstream frames for sending, and downstream scheduler module 1844 accordingly schedules the downstream frames for sending. The downstream frames include periodic management messages. At a time 2506, MAC frame encoder 1852 encodes the periodic management messages into MAC frames, and at time 2508, downstream cryptography module 1830 encrypts the MAC frames. At a time 2510, the encrypted frames are sent to internal downstream data pipeline 1808, and PHY layer 1504 subsequently transmits the encrypted frames.

Figure 26:
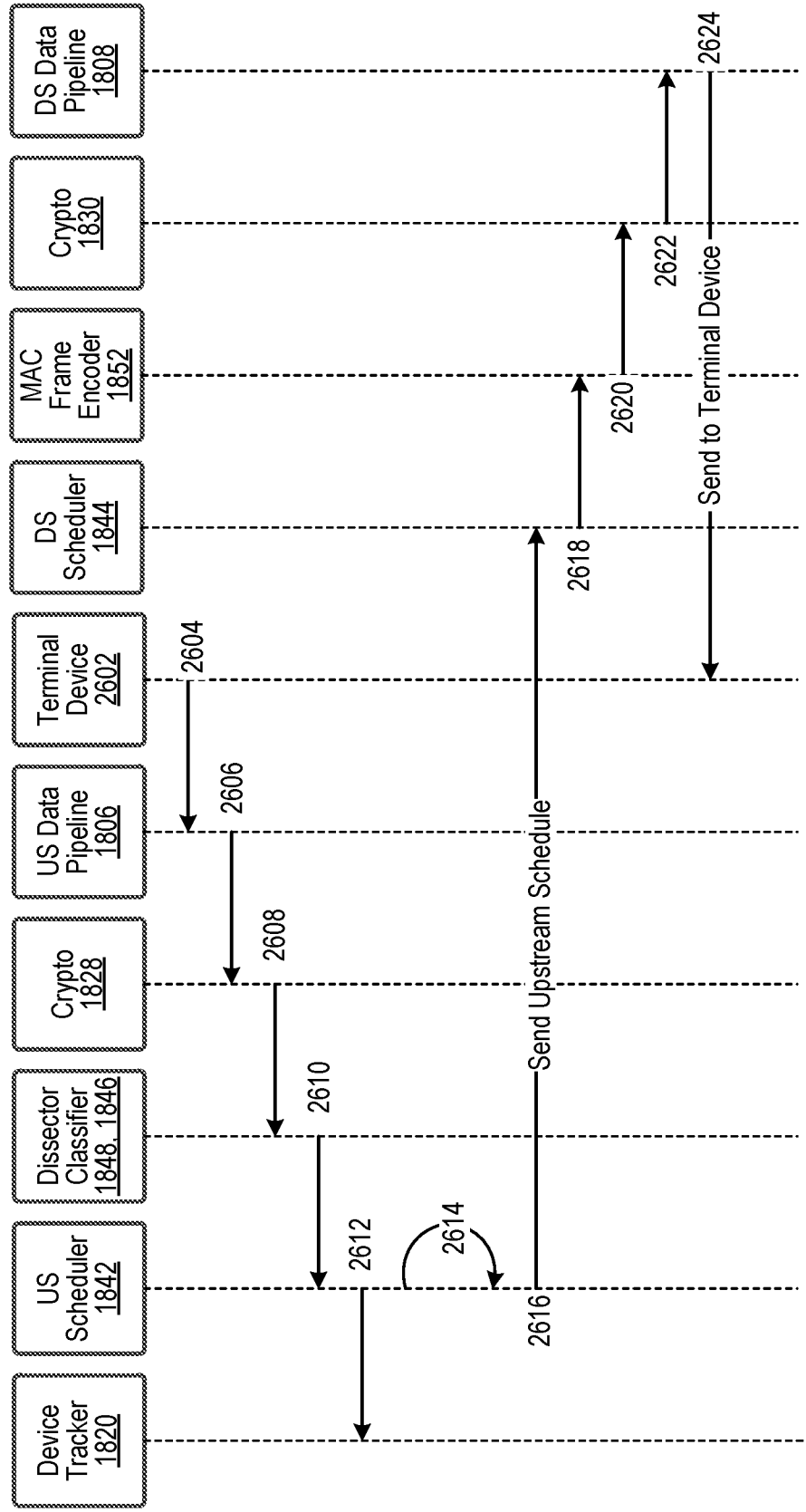
FIG. 26 is a dataflow diagram illustrating one example of processing an upstream scheduling request in an embodiment of the FIG. 18 pluggable MAC sublayer.

FIG. 26 is a dataflow diagram illustrating one example of processing an upstream scheduling request in an embodiment of pluggable MAC sublayer 1802. FIG. 26 includes vertical dashed lines logically representing each of device tracker module 1820, upstream scheduler module 1842, dissector module 1848 and classifier module 1846, upstream cryptography module 1828, internal upstream data pipeline 1806, a terminal device 2602, downstream scheduler module 1844, MAC frame encoder 1852, downstream cryptography module 1830, and internal downstream data pipeline 1808. At a time 2604, internal upstream data pipeline 1806 receives an upstream frame from terminal device 2602 via PHY layer 1504. At a time 2606, upstream cryptography module 1828 decrypts the frame, if needed. At a time 2608, the frame is sent to dissector module 1848 and classifier module 1846. Dissector module 1848 dissects the frame and decodes it into one or more messages. Alternately, multiple frames can be combined into one message. Classifier module 1846 classifies the frame. Data packets of the frame are then forwarded based on their classification.

At a time 2610, bandwidth request messages are sent to upstream scheduler module 1842. Upstream scheduler module 1842 may also proactively schedule upstream bandwidth based on predictive algorithms, reservations, or other scheduling schemes. At a time 2612, upstream scheduler module 1842 cooperates with device tracker module 1820 to identify a device policy for terminal device 2602. Devices and flows may have different policies which impact how much and when the upstream bandwidth is allocated. At a time 2614, upstream scheduler module 1842 identifies if, and if so, when, the bandwidth request can be scheduled. In this example, upstream scheduler module 1842 determines that the bandwidth request can be scheduled, and upstream scheduler module 1842 accordingly schedules the bandwidth request, and upstream scheduler module 1842 sends an upstream schedule to downstream scheduler module 1844 at a time 2616. The upstream schedule includes, for example, a time slot, one or more channels, and/or other information, that will be sent to PHY layer 1504.

At a time 2618 MAC frame encoder 1852 encodes traffic into a MAC frame, and at time 2620, downstream cryptography module 1830 encrypts the MAC frame. At a time 2622, the encrypted frame is sent to internal downstream data pipeline 1808, and at a time 2624, the encrypted frame is sent to terminal device 2602 via internal downstream data pipeline 1808.

Figure 27:
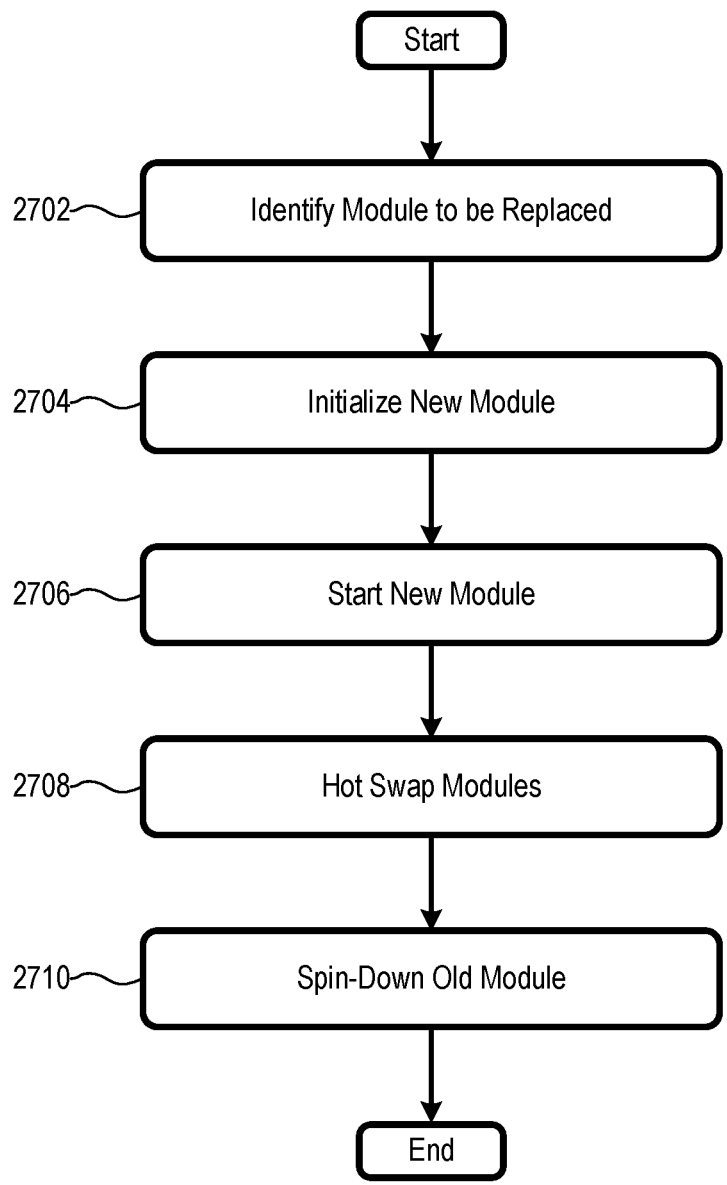
FIG. 27 is a flow chart of a method for replacing a module in an embodiment of the FIG. 18 pluggable MAC sublayer.
Figure 28:
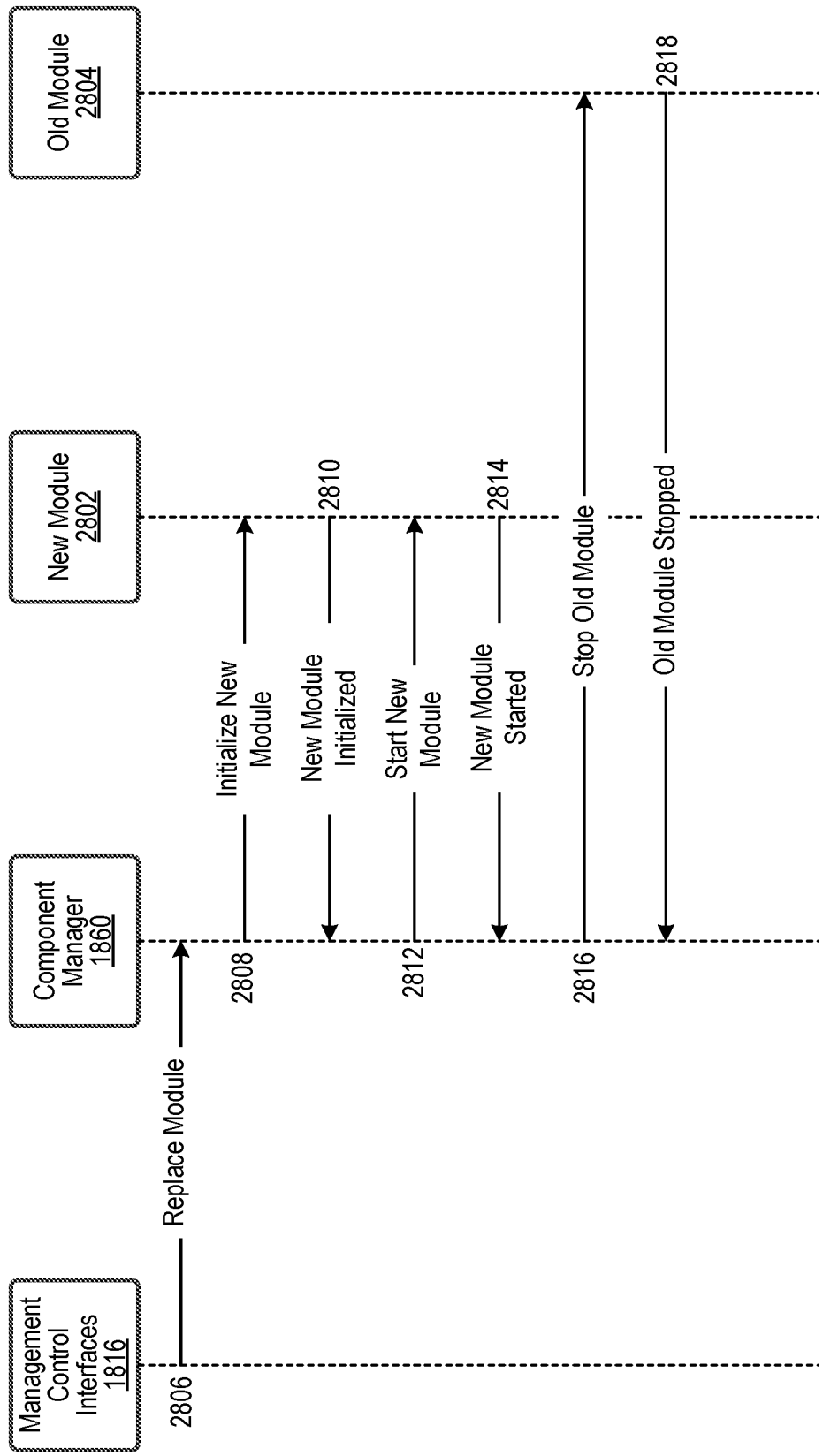
FIG. 28 is a data flow diagram illustrating one example of the FIG. 27 method.

FIG. 27 is a flow chart of a method 2700 for replacing a module in an embodiment of pluggable MAC sublayer 1802, and FIG. 28 is a data flow diagram illustrating one example of method 2700. FIG. 28 includes vertical dashed lines logically representing each of management control interfaces 1816, component manager 1860, a new module 2802, and an old module 2804. In some embodiments, each of new module 2802 and old module 2804 is a MAC module. In a block 2702 of method 2700, a module to be replaced is identified. Internal or external mechanics may initiate a request to replace a running module. A module could be replaced, for example, to upgrade pluggable MAC sublayer 1802, to add capabilities to pluggable MAC sublayer 1802, or to provide different policies to pluggable MAC sublayer 1802. In some embodiments, it is possible to have multiple versions of the same module running concurrently with an additional process to arbitrate between the multiple versions of the same module. In one example of block 2702, management control interfaces 1816 send a request to component manager 1860 to replace old module 2804 with new module 2802, at a time 2806, as illustrated in FIG. 28.

In a block 2704 of method 2700, the new module is initialized. In one example of block 2704, component manager 1860 sends an initialization request to new module 2802 at a time 2808, and new module 2802 is accordingly initialized at a time 2810. In some embodiments, new module 2802 is initialized with configuration and current state data from old module 2804, as needed. In a block 2706 of method 2700, the new module is started. In one example of block 2706, component manager 1860 sends a start request to new module 2802 at a time 2812, and new module 2802 is accordingly started at a time 2814. In a block 2708 of method 2700, the old module is replaced with the new module while pluggable MAC sublayer 1802 is running, or stated differently, the old module is hot-swapped with the new module. In a block 2710 of method 2700, the old module is spun-down (stopped). In one example of block 2710, component manager 1860 sends a stop request to old module 2804 at a time 2816, and old module 2804 is accordingly stopped at a time 2818.

Combinations of Features

Features described above may be combined in various ways without departing from the scope hereof. The following examples illustrate some possible combinations.

(A1) A method for scheduling data transmission in a communication network includes (1) using a first scheduler module, scheduling first data packets for transmission via a first communication medium, (2) using a second scheduler module, scheduling second data packets for transmission via the first communication medium, and (3) using a coordinator, allocating transmission resources of the first communication medium among at least the first and second scheduler modules.

(A2) The method denoted as (A1) may further include (1) receiving an uplink scheduling request, and (2) routing the uplink scheduling request to one of the first scheduler module and the second scheduler module, based at least partially on one or more attributes of the uplink scheduling request.

(A3) Any one of the methods denoted as (A1) and (A2) may further include (1) receiving a downlink scheduling request, and (2) routing the downlink scheduling request to one of the first scheduler module and the second scheduler module, based at least partially on one or more attributes of the downlink scheduling request.

(A4) In any one of the methods denoted as (A1) through (A3), the first data packets may be part of a first data flow, and the second data packets may be part of a second data flow that is different from the first data flow.

(A5) In any one of the methods denoted as (A1) through (A4), the first data packets may comply with a first data transmission protocol, and the second data packets may comply with a second data transmission protocol that is different from the first data transmission protocol.

(A6) In any one of the methods denoted as (A1) through (A5), the first data packets may be associated with a first termination device communicatively coupled to the first communication medium, and the second data packets may be associated with a second termination device communicatively coupled to the first communication medium.

(A7) Any one of the methods denoted as (A1) through (A6) may further include providing flow control for the first and second data packets through the first communication medium using a common Media Access Control (MAC) data plane.

(A8) Any one of the methods denoted as (A1) through (A6) may further include (1) providing flow control for the first data packets through the first communication medium using a first Media Access Control (MAC) data plane, and (2) providing flow control for the second data packets through the second communication medium using a second MAC data plane that is different from the first MAC data plane.

(A9) Any one of the methods denoted as (A1) through (A8) may further include (1) facilitating physical transmission of the first data packets through the first communication medium using a first physical (PHY) layer of the communication network, and (2) facilitating physical transmission of the second data packets through the first communication medium using a second PHY layer of the communication network that is different from the first PHY layer of the communication network.

(A10) In any one of the methods denoted as (A1) through (A9), the resources of the first communication medium may include one or more of transmission time of the first communication medium and transmission frequency of the first communication medium.

(A11) In any one of the methods denoted as (A1) through (A10), the first communication medium may include one or more of a wireline communication medium and a wireless communication medium.

(A12) Any one of the methods denoted as (A1) through (A11) may further include (1) instantiating a third scheduler module in response to a first signal, and (2) scheduling third data packets for transmission via the first communication medium using the third scheduler module.

(A13) The method denoted as (A12) may further include allocating the transmission resources of the first communication medium among at least the first, second, and third scheduler modules, using the coordinator.

(A14) Any one of the methods denoted as (A12) and (A13) may further include terminating the third scheduler module in response to a second signal.

(A15) Any one of the methods denoted as (A1) through (A14) may further include reconfiguring the first scheduler module independently of the second scheduler module.

(B1) A method for controlling data transmission in a communication network includes (1) scheduling transmission of first data packets through a first communication medium at least partially using a first scheduler module of a first Media Access Control (MAC) control plane, and (2) scheduling transmission of second data packets through the first communication medium at least partially using a second scheduler module of a second MAC control plane.

(B2) The method denoted as (B1) may further include coordinating sharing of the first communication medium with the first and second scheduler modules.

(B3) Any one of the methods denoted as (B1) and (B2) may further include (1) controlling flow of the first data packets through the first communication medium at least partially using a first MAC data plane, and (2) controlling flow of the second data packets through the first communication medium at least partially using a second MAC data plane that is different from the first MAC data plane.

(B4) In any one of the methods denoted as (B1) through (B3), (1) the first data packets may be part of a first data flow, and (2) the second data packets may be part of a second data flow that is different from the first data flow.

(B5) In any one of the methods denoted as (B1) through (B4), (1) the first data packets may comply with a first data transmission protocol, and (2) the second data packets comply with a second data transmission protocol that is different from the first data transmission protocol.

(B6) In any one of the methods denoted as (B1) through (B5), (1) the first data packets may be associated with a first termination device communicatively coupled to the first communication medium, and (2) the second data packets may be associated with a second termination device communicatively coupled to the first communication medium.

(C1) A pluggable medium access controller (MAC) layer includes (1) a physical (PHY) layer interface configured to interface the pluggable MAC layer with a PHY layer and (2) a plurality of MAC modules, each MAC module being configured to implement respective functionality of the pluggable MAC layer.

(C2) In the pluggable MAC layer denoted as (C1), the pluggable MAC layer may be a MAC sublayer.

(C3) In either one of the pluggable MAC layers denoted as (C1) and (C2), the respective functionality implemented by at least one of the plurality of MAC modules may be selected from the group consisting of encoding of transmission entities received from additional layers/sublayers into bits for the PHY layer, (b) decoding of bits received from the PHY layer into transmission entities for the additional layers/sublayers, (c) supporting a data transmission protocol, (d) providing frame synchronization, and (e) providing flow control.

(C4) In any one of the pluggable MAC layers denoted as (C1) through (C3), each MAC module of the plurality of MAC modules may be implemented by a processor executing respective MAC module instructions stored in a data store for each MAC module of the plurality of MAC modules.

(C5) Any one of the pluggable MAC layers denoted as (C1) through (C4) may further include a configuration module configured to perform one or more of the following actions: (a) installing one or more instances of the plurality of MAC modules, (b) uninstalling one or more instances of the plurality of MAC modules, and (c) modifying one or more instances of the plurality of MAC modules.

(C6) In the pluggable MAC layer denoted as (C5), the configuration module may be implemented by a processor executing configuration instructions stored in a data store.

(C7) In any one of the pluggable MAC layers denoted as (C1) through (C6), the PHY layer interface may include one or more of (a) a timing module, (b) a PHY capabilities definition module, (c) a PHY state manager module, and (d) management control interfaces.

(C8) In any one of the pluggable MAC layers denoted as (C1) through (C7), the plurality of MAC modules may be implemented in software.

(C9) Any one of the pluggable MAC layers denoted as (C1) through (C8) may further include a data pipeline.

(C10) In any one of the pluggable MAC layers denoted as (C1) through (C9), the plurality of MAC modules may include one or more of (a) an intercomponent communications module, (b) a device tracker module, (c) a ranger module, (d) a registrar module, (e) a provisioner module, (f) an upstream cryptography module, (g) a downstream cryptography module, (h) a device authentication manager module, (i) a device authorization manager module, (j) a PHY controller module, (k) a MAC controller module, (l) a periodic messenger module, (m) an upstream scheduler module, and (n) a downstream scheduler module, (o) a dissector module, (p) a classifier module, (q) a component manager module, and (r) a MAC frame encoder.

(D1) A network termination system includes any one of the pluggable MAC layers denoted as (C1) through (C10).

(D2) The network termination system denoted as (D1) may be selected from the group consisting of a modem termination system, a cable modem termination system (CMTS), a digital subscriber line access multiplexer (DSLAM), an optical line terminal (OLT), a cellular wireless communication core, a satellite wireless communication core, and a satellite wireless communication ground station.

(E1) A network termination device includes any one of the pluggable MAC layers denoted as (C1) through (C10).

(E2) The network termination device denoted as (E1) may be selected from the group consisting of a cable modem, a digital subscriber line (DSL) modem, a wireless modem, an optical network unit (ONU), an optical network termination (ONT), a fiber node, a remote terminal, a wireless base station, and a gateway.

(F1) A pluggable medium access controller (MAC) layer includes (1) an upstream data pipeline, (2) a downstream data pipeline, (3) a physical layer (PHY) capabilities definition module, (4) a PHY state manager module, (5) a management control interface, and (6) a plurality of additional MAC modules, each additional MAC module being configured to implement respective functionality of the pluggable MAC layer.

(F2) In the pluggable MAC layer of (F1), the pluggable MAC layer may be a MAC sublayer.

(F3) In either one of the pluggable MAC layers denoted as (F1) and (F2), the plurality of additional MAC modules may be implemented in software.

(F4) In any one of the pluggable MAC layers denoted as (F1) through (F3), each MAC module of the plurality of additional MAC modules may be implemented by a processor executing respective MAC module instructions stored in a data store for each additional MAC module of the plurality of additional MAC modules.

(F5) In any one of the pluggable MAC layers denoted as (F1) through (F4), the plurality of additional MAC modules may include one or more of (a) an intercomponent communications module, (b) a device tracker module, (c) a ranger module, (d) a registrar module, (e) a provisioner module, (f) an upstream cryptography module, (g) a downstream cryptography module, (h) a device authentication manager module, (i) a device authorization manager module, (j) a PHY controller module, (k) a MAC controller module, (l) a periodic messenger module, (m) an upstream scheduler module, (n) a downstream scheduler module, (o) a dissector module, (p) a classifier module, (q) a component manager module, and (r) a MAC frame encoder.

(F6) Any one of the pluggable MAC layers denoted as (F1) through (F5) may further include a configuration module configured to perform one or more of the following actions: (a) installing one or more instances of the plurality of additional MAC modules, (b) uninstalling one or more instances of the plurality of additional MAC modules, and (c) modifying one or more instances of the plurality of additional MAC modules.

(G1) A network termination system includes any one of the pluggable MAC layers denoted as (F1) through (F6), and the network termination system may be selected from the group consisting of a modem termination system, a cable modem termination system (CMTS), a digital subscriber line access multiplexer (DSLAM), an optical line terminal (OLT), a cellular wireless communication core, a satellite wireless communication core, and a satellite wireless communication ground station.

(H1) A network termination device includes any one of the pluggable MAC layers denoted as (F1) through (F6), and the network termination device may be selected from the group consisting of a cable modem, a digital subscriber line (DSL) modem, a wireless modem, an optical network unit (ONU), an optical network termination (ONT), a fiber node, a remote terminal, a wireless base station, and a gateway Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A network termination system, comprising:
   a pluggable medium access controller (MAC) layer, including:
   a physical (PHY) layer interface configured to interface the pluggable MAC layer with a PHY layer, and
   a plurality of MAC modules, each MAC module being configured to implement respective functionality of the pluggable MAC layer;
   wherein the network termination system is selected from a group consisting of a modem termination system, a cable modem termination system (CMTS), a digital subscriber line access multiplexer (DSLAM), an optical line terminal (OLT), a cellular wireless communication core, a satellite wireless communication core, and a satellite wireless communication ground station.

2. The network termination system of claim 1, wherein the pluggable MAC layer is a MAC sublayer.

3. The network termination system of claim 1, wherein the respective functionality implemented by at least one of the plurality of MAC modules is selected from the group consisting of (a) encoding of transmission entities received from additional layers/sublayers into bits for the PHY layer, (b) decoding of bits received from the PHY layer into transmission entities for the additional layers/sublayers, (c) supporting a data transmission protocol, (d) providing frame synchronization, and (e) providing flow control.

4. The network termination system of claim 1, wherein the plurality of MAC modules are implemented in software.

5. The network termination system of claim 1, wherein each MAC module of the plurality of MAC modules is implemented by a processor executing respective MAC module instructions stored in a data store for each MAC module of the plurality of MAC modules.

6. The network termination system of claim 1, further comprising a configuration module configured to perform one or more of the following actions: (a) installing one or more instances of the plurality of MAC modules, (b) uninstalling one or more instances of the plurality of MAC modules, and (c) modifying one or more instances of the plurality of MAC modules.

7. The network termination system of claim 6, wherein the configuration module is implemented by a processor executing configuration instructions stored in a data store.

8. The network termination system of claim 1, further comprising a data pipeline.

9. The network termination system of claim 1, wherein the PHY layer interface comprises one or more of (a) a timing module, (b) a PHY capabilities definition module, (c) a PHY state manager module, and (d) management control interfaces.

10. The network termination system of claim 1, wherein the plurality of MAC modules comprise one or more of (a) an intercomponent communications module, (b) a device tracker module, (c) a ranger module, (d) a registrar module, (e) a provisioner module, (f) an upstream cryptography module, (g) a downstream cryptography module, (h) a device authentication manager module, (i) a device authorization manager module, (j) a PHY controller module, (k) a MAC controller module, (l) a periodic messenger module, (m) an upstream scheduler module, (n) a downstream scheduler module, (o) a dissector module, (p) a classifier module, (q) a component manager module, and (r) a MAC frame encoder.

11. A network termination device, comprising:
   a pluggable medium access controller (MAC) layer, including:
   a physical (PHY) layer interface configured to interface the pluggable MAC layer with a PHY layer, and
   a plurality of MAC modules, each MAC module being configured to implement respective functionality of the pluggable MAC layer;

wherein the network termination device is selected from a group consisting of a cable modem, a digital subscriber line (DSL) modem, a wireless modem, an optical network unit (ONU), an optical network termination (ONT), a fiber node, a remote terminal, a wireless base station, and a gateway.

12. A network termination system, comprising:
a pluggable MAC layer, including:
an upstream data pipeline,
a downstream data pipeline,
a physical layer (PHY) capabilities definition module,
a PHY state manager module,
a management control interface, and
a plurality of additional MAC modules, each additional MAC module being configured to implement respective functionality of the pluggable MAC layer;
wherein the network termination system being selected from a group consisting of a modem termination system, a cable modem termination system (CMTS), a digital subscriber line access multiplexer (DSLAM), an optical line terminal (OLT), a cellular wireless communication core, a satellite wireless communication core, and a satellite wireless communication ground station.

13. The network termination system of claim 12, wherein the pluggable MAC layer is a MAC sublayer.

14. The network termination system of claim 12, wherein the plurality of additional MAC modules are implemented in software.

15. The network termination system of claim 12, wherein each MAC module of the plurality of additional MAC modules is implemented by a processor executing respective MAC module instructions stored in a data store for each additional MAC module of the plurality of additional MAC modules.

16. The network termination system of claim 12, wherein the plurality of additional MAC modules comprise one or more of (a) an intercomponent communications module, (b) a device tracker module, (c) a ranger module, (d) a registrar module, (e) a provisioner module, (f) an upstream cryptography module, (g) a downstream cryptography module, (h) a device authentication manager module, (i) a device authorization manager module, (j) a PHY controller module, (k) a MAC controller module, (l) a periodic messenger module, (m) an upstream scheduler module, (n) a downstream scheduler module, (o) a dissector module, (p) a classifier module, (q) a component manager module, and (r) a MAC frame encoder.

17. The network termination system of claim 12, further comprising a configuration module configured to perform one or more of the following actions: (a) installing one or more instances of the plurality of additional MAC modules, (b) uninstalling one or more instances of the plurality of additional MAC modules, and (c) modifying one or more instances of the plurality of additional MAC modules.

18. A network termination device, comprising;
a pluggable MAC layer, including:
an upstream data pipeline,
a downstream data pipeline,
a physical layer (PHY) capabilities definition module,
a PHY state manager module,
a management control interface, and
a plurality of additional MAC modules, each additional MAC module being configured to implement respective functionality of the pluggable MAC layer;
wherein the network termination device is selected from a group consisting of a cable modem, a digital subscriber line (DSL) modem, a wireless modem, an optical network unit (ONU), an optical network termination (ONT), a fiber node, a remote terminal, a wireless base station, and a gateway.

19. The network termination device of claim 11, wherein the pluggable MAC layer is a MAC sublayer.

20. The network termination device of claim 11, wherein the pluggable MAC layer further includes a configuration module configured to perform one or more of the following actions: (a) installing one or more instances of the plurality of MAC modules, (b) uninstalling one or more instances of the plurality of MAC modules, and (c) modifying one or more instances of the plurality of MAC modules.

21. The network termination device of claim 18, wherein the pluggable MAC layer is a MAC sublayer.

22. The network termination device of claim 18, wherein the pluggable MAC layer further includes a configuration module configured to perform one or more of the following actions: (a) installing one or more instances of the plurality of additional MAC modules, (b) uninstalling one or more instances of the plurality of additional MAC modules, and (c) modifying one or more instances of the plurality of additional MAC modules.

* * * * *